US012712291B2

(12) United States Patent
Copper et al.

(10) Patent No.: US 12,712,291 B2
(45) Date of Patent: Aug. 18, 2026

(54) CYLINDRICAL STAMPED ELECTRICAL POWER TERMINAL

(71) Applicant: FCI USA LLC, Etters, PA (US)

(72) Inventors: Charles Copper, Hummelstown, PA (US); Nebu Pulinikunnathil Mathew, Kerala (IN)

(73) Assignee: FCI USA LLC, Etters, PA (US)

(*) Notice: Subject to any disclaimer, the term of this patent is extended or adjusted under 35 U.S.C. 154(b) by 822 days.

(21) Appl. No.: 17/939,733

(22) Filed: Sep. 7, 2022

(65) Prior Publication Data

US 2023/0402768 A1 Dec. 14, 2023

(30) Foreign Application Priority Data

Jun. 10, 2022 (IN) ............................ 202221033359

(51) Int. Cl.
*H01R 4/18* (2006.01)
*H01R 13/11* (2006.01)
*H01R 43/16* (2006.01)

(52) U.S. Cl.
CPC ........... *H01R 4/183* (2013.01); *H01R 13/111* (2013.01); *H01R 43/16* (2013.01)

(58) Field of Classification Search
CPC ............................. H01R 13/111; H01R 13/16
See application file for complete search history.

(56) References Cited

U.S. PATENT DOCUMENTS 3,969,012 A * 7/1976 Bauer .................... H01R 13/04 439/891
4,906,212 A 3/1990 Mixon, Jr.
(Continued)

FOREIGN PATENT DOCUMENTS

CN 210224359 U 3/2020
EP 0915532 A2 5/1999
(Continued)

OTHER PUBLICATIONS

Examination Report dated Nov. 30, 2022 in connection with Indian Application No. 202221033359.
(Continued)

*Primary Examiner* — Neil Abrams
(74) *Attorney, Agent, or Firm* — Wolf, Greenfield & Sacks, P.C.

(57) ABSTRACT

High current, light, and low-cost electrical power terminals that can withstand many mating cycles. A socket or a pin may be formed from a monolithic metal sheet, which may be stamped and formed into a terminal with a hollow portion, such as a cylindrical barrel. Features defining the radius of the barrel may be stamped in the sheet with high precision. The socket and the pin are shaped such that the positions of the mating contact surfaces of each terminal, and therefore the interference between them, are positioned based on these features. The terminals may have a low and precise interference, enabling the terminals to be designed with a low contact force that enables a long lifespan, such as 10,000 mating cycles. The terminals may have a high current capacity, such as 50 A or higher, and may be used in high current applications, such as a charging station or an electric vehicle, or in an application that calls for charging or discharging a battery.

20 Claims, 9 Drawing Sheets

(56) References Cited

U.S. PATENT DOCUMENTS

| | | | | |
|---|---|---|---|---|
| 4,923,416 | A | 5/1990 | Zinn | |
| 5,667,413 | A * | 9/1997 | Trafton | H01R 13/187 439/271 |
| 5,934,938 | A * | 8/1999 | Clark | H01R 13/5208 439/275 |
| 6,146,211 | A * | 11/2000 | Okamoto | H01R 13/44 439/825 |
| 6,592,409 | B1 * | 7/2003 | Oehme | H01R 13/52 439/732 |
| 6,899,572 | B1 | 5/2005 | Baker et al. | |
| 7,806,737 | B2 | 10/2010 | Mark et al. | |
| 8,079,885 | B1 | 12/2011 | Lin | |
| 8,662,914 | B2 | 3/2014 | Keswani | |
| 8,821,196 | B2 * | 9/2014 | Blasick | H01R 13/111 439/851 |
| 9,466,912 | B2 * | 10/2016 | Matsumoto | H01R 13/44 |
| 9,787,012 | B2 | 10/2017 | Kawaguchi et al. | |
| 9,812,815 | B2 | 11/2017 | Chen | |
| 10,008,800 | B2 * | 6/2018 | Inoue | H01R 13/42 |
| D840,942 | S | 2/2019 | DeVito | |
| 10,916,873 | B2 | 2/2021 | Cormier et al. | |
| 11,075,483 | B2 * | 7/2021 | Lai | H01R 13/5219 |
| 11,128,077 | B1 * | 9/2021 | Lai | H01R 13/111 |
| 12,170,419 | B2 * | 12/2024 | Lai | H01R 13/631 |
| 2014/0038473 | A1 | 2/2014 | Kojima et al. | |

FOREIGN PATENT DOCUMENTS

| | | | |
|---|---|---|---|
| EP | 3477783 | A1 | 5/2019 |
| IN | 25/2009 | | 6/2009 |
| JP | 2020-087580 | A | 6/2020 |
| WO | 2008/051709 | A2 | 5/2008 |

OTHER PUBLICATIONS

Extended European Search Report dated Nov. 6, 2023 in connection with European Application No. 23177948.9.

* cited by examiner

CYLINDRICAL STAMPED ELECTRICAL POWER TERMINAL

CROSS-REFERENCE TO RELATED APPLICATIONS

This application claims the priority to and the benefit under 35 U.S.C. § 119 of Indian Patent Application No. 202221033359, filed Jun. 10, 2022, entitled "CYLINDRICAL STAMPED ELECTRICAL POWER TERMINAL," the contents of which are incorporated herein by reference in their entirety.

BACKGROUND

The disclosure relates generally to interconnection systems, such as those including electrical connectors used to interconnect electrical assemblies, and more specifically to power terminals of electrical connectors.

For example, electrical connectors may be used to connect an electric vehicle to a charging station so that power may be transferred from the charging station to the electric vehicle to charge the batteries in the electric vehicle. To make this power transfer, the electric vehicle may have a receptacle connector with terminals configured as sockets. The charging station may have a plug connector that mates with the receptacle connector. The plug connector may have terminals shaped as pins that fit within the sockets of the receptacle connector. To connect the electric vehicle to the charging station and complete a power circuit, the plug connector may be inserted into receptacle connector. Inserting the plug into the receptacle connector deflects beams of the sockets that press against the pins, generating a contact force that creates a low resistance path between the plug connector and the receptacle connector.

SUMMARY

According to aspects of the disclosure, there is a power terminal for an electrical connector, the terminal having an insertion axis and comprises a metal sheet. The metal sheet comprises a hollow portion comprising a portion of the sheet formed around the insertion axis, a mounting contact coupled to the hollow portion, and a mating contact on an exterior portion of the hollow portion.

Optionally, the portion of the metal sheet formed into the hollow portion comprises a first edge and a second edge and the portion of the metal sheet is formed such that the first edge is adjacent to the second edge.

Optionally, the first edge comprises a first engagement member, the second edge comprises a second engagement member, and the first engagement member is engaged with the second engagement member.

Optionally, the first edge abuts the second edge.

Optionally, the metal sheet comprises a distal edge perpendicular to the first edge and the second edge, and the distal edge of the sheet is coined such that the distal end of the hollow portion is chamfered.

Optionally, the terminal further comprises plating selectively covering the mating contact.

Optionally, the hollow portion is a cylindrical barrel and the outer diameter of the barrel is between 3.6 and 4.8 mm.

Optionally, the terminal further comprises an insulative cap inserted into the hollow portion.

Optionally, the terminal comprises a pin and the metal sheet is a single, integral sheet.

Optionally, the hollow portion has a rectangular cross section.

According to aspects of the disclosure, there is a power terminal for an electrical connector, the terminal having an insertion axis and comprising a metal sheet. The metal sheet comprises a base comprising a portion of the sheet formed around the insertion axis, a mounting contact coupled to the base, and a plurality of deflectable beams extending from the base parallel to the insertion axis. Each deflectable beam of the plurality of deflectable beams comprises a mating contact, the plurality of deflectable beams are arranged around the insertion axis, and the mating contact of each deflectable beam faces the insertion axis.

Optionally, the plurality of deflectable beams are arranged in a circle around the insertion axis.

Optionally, each deflectable beam extending from the base parallel to the insertion axis comprises a straight beam with the mating contact formed at a distal end of the straight beam.

Optionally, each deflectable beam extending from the base parallel to the insertion axis comprises a straight beam with an arced segment and the mating contact is on the arced segment.

Optionally, the base comprises a portion of the metal sheet comprising a first edge and a second edge separated by a width and the portion of the metal sheet is rolled into a barrel with the first edge adjacent to the second edge.

Optionally, the terminal is configured to undergo 10,000 mating cycles with a complementary power terminal.

Optionally, the metal sheet has a thickness of between 0.3 and 0.7 mm.

Optionally, the metal sheet has a thickness of about 0.5 mm.

Optionally, a ratio a length of each deflectable beam to a thickness of the metal sheet is between 27:1 and 8:1.

Optionally, a ratio a length of each deflectable beam to a thickness of the metal sheet is about 18:1.

Optionally, each deflectable beam has a width of between 0.7 and 1.3 mm.

Optionally, each deflectable beam has a width of about 1 mm.

Optionally, a ratio a length of each deflectable beam to a width of each deflectable beam is between 12:1 and 4:1.

Optionally, a ratio a length of each deflectable beam to a width of each deflectable beam is about 7:1.

Optionally, each deflectable beam has a length of between 7 and 9 mm.

Optionally, each deflectable beam has a length of about 8.5 mm.

Optionally, the plurality of deflectable beams is 8 to 16 deflectable beams.

Optionally, the plurality of deflectable beams is 12 deflectable beams.

Optionally, there is an electrical power system, wherein the terminal is configured to mate with a complementary power terminal. The system comprises an electric vehicle or a system configured to charge and/or discharge a battery comprising the terminal or the complementary power terminal.

Optionally, there is an electrical power system, wherein the terminal of is configured to mate with a complementary power terminal. The system comprises an electric vehicle charging station or a system configured to charge and/or discharge a battery comprising the terminal or the complementary power terminal.

Optionally, the terminal is configured to transmit electrical power having a current of at least 75 A.

Optionally, the terminal further comprises plating on the mating contact of each deflectable beam.

Optionally, the plating comprises silver.

Optionally, the plating comprises a first layer comprising a palladium nickel alloy and a second layer comprising gold.

Optionally, the metal sheet comprises a copper alloy.

According to aspects of the disclosure, there is an electrical power system comprising a first electrical connector and a second electrical connector. The first electrical connector comprises a first power terminal, the first terminal comprising a first stamped metal sheet formed around a first insertion axis, the first metal sheet comprising a hollow portion comprising a portion of the sheet formed around the insertion axis, a first mounting contact coupled to the base, and a first mating contact on an exterior portion of the hollow portion. The second electrical connector comprises a second power terminal, the second terminal configured to mate with the first power terminal, the second terminal comprising a second metal sheet formed around a second insertion axis, the second metal sheet comprising a base comprising a portion of the sheet formed around the insertion axis, a second mounting contact coupled to the base, and a plurality of deflectable beams extending from the second base. Each deflectable beam of the plurality of deflectable beams comprises a second mating contact, the plurality of deflectable beams are arranged in a circle around the second insertion axis, and the second mating contact of each deflectable beam faces the second insertion axis.

Optionally, each of the plurality of deflectable beams of the second terminal generates a contact force of less than 1.0 N when the second power terminal is mated to the first power terminal.

Optionally, each of the plurality of deflectable beams of the second terminal generates a contact force of about 0.1 to 1.0 N when the second power terminal is mated to the first power terminal.

Optionally, each of the plurality of deflectable beams of the second terminal generates a contact force of about 0.43 to 0.76 N when the second power terminal is mated to the first power terminal.

Optionally, the first terminal and the second terminal have a radial interference of less than 0.25 mm when mated.

Optionally, the first terminal and the second terminal have a radial interference between 0.1 to 0.175 mm when mated.

Optionally, the hollow portion of the first terminal is a cylindrical barrel and the barrel has an outer diameter between 3.0 to 5.5 mm.

Optionally, the hollow portion of the first terminal is a cylindrical barrel and the barrel has an outer diameter between 3.6 to 4.8 mm.

Optionally, each of the plurality of deflectable beams of the second terminal is configured such that, when the second power terminal is mated to the first power terminal, the deflectable beam deflects by an amount less than 40% of a deflection at an elastic limit of the deflectable beam.

According to aspects of the disclosure, there is a method of manufacturing a power terminal for an electrical connector, comprising providing a metal sheet, stamping the metal sheet, and forming, using the stamped metal sheet a hollow portion about an insertion axis of the terminal, a mounting contact coupled to the hollow portion, and a mating contact on an exterior portion of the hollow portion.

Optionally, forming the hollow portion comprises rolling the metal sheet into a barrel.

Optionally, forming the hollow portion comprises abutting a first edge of the metal sheet and a second edge of the metal sheet.

Optionally, forming the hollow portion further comprises engaging a first engagement member at the first edge with a second engagement member at the second edge.

Optionally, forming the hollow portion comprises forming a cylindrical barrel with an outer diameter between 3.6 and 4.8 mm.

Optionally, the method further comprises selectively plating the metal sheet.

According to aspects of the disclosure, there is a method of manufacturing a power terminal for an electrical connector, comprising providing a metal sheet, stamping the metal sheet to form a plurality of deflectable beams each comprising a mating contact, and forming, using the stamped metal sheet, a base around an insertion axis. The plurality of deflectable beams extend from the base parallel to the insertion axis, the plurality of deflectable beams are arranged around the insertion axis, and the mating contact of each deflectable beam faces the insertion axis.

Optionally, forming the base comprises rolling the metal sheet such that the plurality of deflectable beams are arranged in a circle around the insertion axis.

Optionally, stamping the metal sheet to form a plurality of deflectable beams comprises forming each deflectable beam to comprise a straight beam with the mating contact formed at a distal end of the straight beam.

Optionally, stamping the metal sheet to form a plurality of deflectable beams comprises forming each deflectable beam to comprise a straight beam with an arced segment with the mating contact on the arced segment.

Optionally, forming the base comprises abutting a first edge of the metal sheet and a second edge of the metal sheet.

Optionally, forming the base portion further comprises engaging a first engagement member at the first edge with a second engagement member at the second edge.

Optionally, stamping the metal sheet to form a plurality of deflectable beams comprises stamping each beam with a ratio a length of each deflectable beam to a thickness of the metal sheet between 27:1 and 8:1.

Optionally, stamping the metal sheet to form a plurality of deflectable beams comprises stamping each beam with a ratio a length of each deflectable beam to a thickness of the metal sheet of about 18:1.

Optionally, stamping the metal sheet to form a plurality of deflectable beams comprises stamping each beam with a width between 0.7 and 1.3 mm.

Optionally, stamping the metal sheet to form a plurality of deflectable beams comprises stamping each beam with a width of about 1 mm.

Optionally, stamping the metal sheet to form a plurality of deflectable beams comprises stamping each beam with a ratio a length of each deflectable beam to a width of each deflectable beam between 12:1 and 4:1.

Optionally, stamping the metal sheet to form a plurality of deflectable beams comprises stamping each beam with a width of each deflectable beam of about 7:1.

Optionally, stamping the metal sheet to form a plurality of deflectable beams comprises stamping each beam with a length of between 7 and 9 mm.

Optionally, stamping the metal sheet to form a plurality of deflectable beams comprises stamping each beam with a length of about 8.5 mm.

Optionally, stamping the metal sheet to form a plurality of deflectable beams comprises stamping 8 to 16 deflectable beams.

Optionally, stamping the metal sheet to form a plurality of deflectable beams comprises stamping 12 deflectable beams.

Optionally, the method further comprises selectively plating the metal sheet.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF INVENTION

Figure 1B:
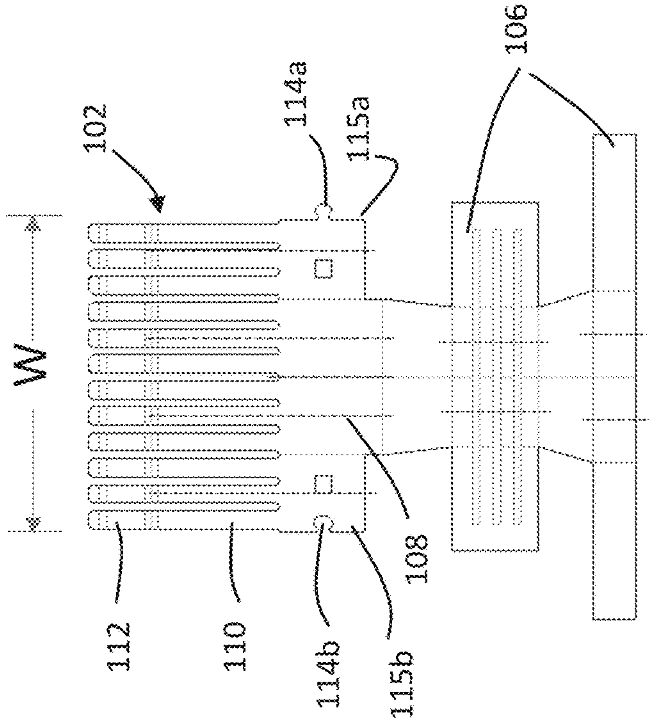
FIG. 1B is a top view of a metal sheet that may be formed into the socket of FIG. 1A.

The inventors have recognized and appreciated designs for power terminals that may enable long life span, high current, and low-cost power connectors. These designs, for example, may be used in plug and receptacle connectors used in charging stations and electronic vehicles or other applications that require the terminals to carry a high current, such as 70 A or more, and can endure a large number of mating cycles, such as ten thousand or more.

The inventors have recognized and appreciated that conventional approaches for achieving high current connectors and connectors that can withstand a large number of mating cycles are inconsistent. High current conventionally may be achieved by reducing the contact resistance of the connector by increasing the contact force at contact surfaces of mating terminals. High contact force, however, increases wear on plating to provide a low resistance contact, increases the risk of cracking of the metal of deflectable portions of the terminals and consequently reduces the number of mating cycles the connector can endure. Further, conventional power connectors are often expensive to manufacture because they use machined pins for terminals in the connectors.

As described herein, a terminal configured as a socket and/or a pin for a power connector may be formed from a single sheet of conductive material, resulting in monolithic terminals that may be formed less expensively than machined terminals. Manufacturing a terminal by stamping and forming a sheet of metal enables features that provide multiple desirable properties simultaneously to be formed. For example, these terminals may be formed in larger diameter than machined parts, yet with lower cost and weight. As a result, the terminals may be made with a larger contact surface, enabling the terminals to carry more current. At the same time, the terminal may be designed with lower contact force such that the connectors may withstand a large number of mating cycles. The terminals may be readily shaped to reliably operate with low deflection of mating contacts of the terminals, which also increases life span of the terminals. Further, formation of terminals from a sheet of metal enables highly selective application of plating on contact surfaces, which further reduces cost while supporting a large number of mating cycles. Such terminals nonetheless may serve similar roles as conventional socket and pin terminals that mate to complete a power circuit to carry a high current.

Either or both of the mating terminals may be constructed from a single sheet of conductive material. These terminals may be constructed with low-cost manufacturing operations. In one or a small number of relatively simple operations, a receptable or pin terminal may be constructed. For example, a single conductive sheet may first be stamped from a continuous conductive sheet. The conductive sheet may be a metal such as copper. The portions of the sheet that will become the contact surface of the terminal may be selectively plated with material providing desired contact surface properties. Then, the stamped sheet may be formed into a terminal, shaped as a socket or pin. For example, the sheet may be rolled in a circle to form tubular terminals. As part of the rolling operating, a first engagement member of the metal sheet may be engaged with a second to hold edges of the sheet against one another. Additionally, in the same stamping and forming operations, mounting contacts, features to engage an insulative housing, and other features of the connector may also be created.

The socket may have a first set of mating contacts arranged around a first circle, and a pin may have a contact surface around a second circle. The second circle may have a radius different from the first circle. For example, the second circle may have a greater radius than the first circle so that mating contacts of the socket engage the contact surface of the pin terminal when the pin is inserted into the socket. The mating contacts of the socket, for example, may be shaped as beams with contact surfaces near a distal end of the beams. Insertion of the pin into the socket during mating of plug and receptacle connectors may deflect the beams to provide a contact force between the contact surfaces on the beams of the socket and the contact surface of the pin.

Power terminals as described herein may provide long lifespan connectors. In some embodiments, each terminal may withstand 10,000 mating cycles of plugging and unplugging and still provide a high current interconnect. For example, the terminals may withstand 10,000 mating cycles while still providing appropriate mating resistance for the terminals to functionally transfer power between the terminals. The power terminals may have a low contact force distributed over a relatively large area to provide a low contact surface pressure that leads to long life span of the terminals while still providing low contact resistance for high current-carrying capacity. Low contact pressure reduces wear on mating contact surfaces of the terminals, for example, wear on plating of the mating contacts.

To provide a low contact force, deflecting mating contacts of terminals described herein may be formed with low spring rates relative to conventional connectors. In some embodiments, deflecting mating contacts are formed as beams. A beam may be formed with a low spring rate by providing a high aspect ratio beam having long length, narrow width and/or thin thickness. Increasing the length of the beam with respect to the width and thickness of the beam increases the aspect ratio of the beam and reduces the spring rate of the beam. A beam with a reduced spring rate may require reduced force to deflect. By reducing the spring rate of the mating contacts of the socket, the contact force between the two terminals may be reduced.

The inventors have recognized and appreciated that the length, width, and thickness of a beam may not be arbitrarily selected without degrading the current carrying capacity of the terminal. However, a socket may be made from a sheet of copper alloy with a high IACS value such as C18080 or C18070 R460, with 80 to 83% IACS for example, with a thickness in the range of 0.3 to 0.7 mm, such as about 0.5 mm, with a beam length of 6-10 mm or 7-9 mm, such as about 8.5 mm, and a beam width of 0.7 to 1.3 mm, such as about 1 mm.

To provide low contact pressure, terminals described herein may have a lower contact force and/or a larger contact radius and therefore larger contact area. Socket terminals as described herein may have an increased number of mating contacts to provide increased current carrying capacity even with low contact pressure. Manufacturing the terminals by stamping and forming a sheet of metal facilitates low cost manufacture of terminals in shapes that provide high current carrying capacity over a large number of mating cycles.

Low contact pressure also may come about by limiting deflection of mating contacts that generate contact pressure, which may also be economically achieved with stamped and formed terminals. Limiting deflection may also increase life span of a terminal by reducing the onset of cracking of the terminal. The inventors have recognized and appreciated that cracking of metal portions of the terminals may occur as a result of repeatedly stressing the metal by deflecting a portion of the terminal during mating. Cracking is less likely, however, when the metal portions of terminals are only subjected to stresses far below the elastic limit of the metal during mating. The inventors have recognized and appreciated that limiting contact pressure by reducing the amount of deflection may also reduce the onset of cracking to provide a longer life span in terms of mating cycles for the terminals.

Deflection may be limited by configuring the mating terminals with a low amount of interference between mating terminals. When two terminals mate, mating contact surfaces of at least one of the two terminals are deflected a distance to enable mating. The amount of deflection is dependent on the interference between the terminals. The amount of interference may be dependent on the geometries of the two terminals.

For example, for a socket and a pin, the inner radius of a chamber of the socket receiving the pin during mating may be smaller than the outer radius of the pin. In this example, the interference is the amount by which the outer radius of the pin is greater than the inner radius of the chamber of the socket. When the two terminals are mated, the mating contacts of the terminals deflect by the amount of the interference. The terminals may be designed such that, when the mating contacts are deflected, they behave as springs and an increased deflection increases contact force. Therefore, a greater deflection from a greater interference generates greater contact force. By reducing the interference between the socket terminal and the pin terminal, the contact force between the two terminals may be reduced, which may reduce wear on the contact surfaces and increase the number of mating cycles the terminals can undergo while still providing low contact resistance to support a high current.

However, the inventors have recognized and appreciated that, in practice, proper operation of a power connector designed with reduced deflection may be influenced by the shape of the terminals and how the shape contributes to the tolerance stackup of the connector. To ensure reliable operation with a low contact force as described herein, terminals may have shapes that may be readily produced in stamping and metal forming operations that contribute little to the tolerance stackup. For example, each terminal may be cylindrical with substantially uniform diameter. Interference between the two terminals may result from forming a curved segment containing the contact surface on one of the terminals. The outer surface of the inner terminal and the inner wall of the outer terminal may otherwise be parallel over substantially the mating portions of the terminals. The curved segment, for example, may extend over less than 25% of the length of the mating portion of the terminal, in some examples, or less than 20% in some examples.

The curved segment creating the interference may have a shape that may be formed with relatively high precision, such as a semicircular arc. The inventors have recognized and appreciated that in a terminal manufactured with stamping and metal forming operations, the positional accuracy of a mating contact surface formed on an arced segment of a straight beam may be higher than shapes that provide interference between the terminals by providing a bend in the beam. As a result, the design contributes less to the tolerance stackup than, for example, a terminal in which a mating contact surface is formed on a beam that has a bend or curvature over a longer portion of its length.

The inventors have further recognized and appreciated that reducing tolerance stackup contributes to longevity of a power terminal because the terminal may be designed for a lower contact force. To ensure a sufficiently low contact resistance, the terminals may be designed for a minimum contact force. If the mating contact surfaces could be positioned with no variation in position, the terminals could be designed to provide exactly the desired minimum mating contact forces. The terminal, however, cannot be manufactured such that the mating contact surfaces in all cases are in exactly the desired position.

Rather, the position of the mating contact surfaces from connector to connector will vary by an amount dictated by a tolerance stackup. To account for this variability, the terminals may be designed such that the desired minimum contact force is provided for the worst-case position of contact surfaces, which occurs when the mating contact surfaces are at a position within the tolerance stackup for those components that results in the least interference and therefore smallest deflection of the deflectable portion of the terminal. When the terminals are not in this worst-case position, the contact force will be higher. The maximum amount of contact force will occur for terminals in which the mating contact surfaces are at a position in the tolerance stackup where the interference is greatest. As a result, the worst case and the part-to-part average contact force will be greater than the desired minimum contact force for connectors with a tolerance stackup. The amount by which the worst case and the part-to-part average contact force is above the desired minimum contact force will be greater with greater tolerance stackup. Even if the terminal is designed with a target force other the desired minimum contact force, a larger tolerance stackup will result in a larger maximum contact force across multiple connectors manufactured in the same way. Reducing the maximum contact force and/or part-to-part average contact force in mated terminals may increase the lifespan of the terminals.

For example, terminals as described herein may result in tolerance stackup leading to a variation of radial interference between a socket and a pin of +/−0.375 mm. As shown in FIG. 10, this variation may result in a range of contact force in parts manufactured according to the design from an upper bound of contact force of 0.76 N, with a variability of contact force of 0.33 N. Accordingly, the terminals may be manufactured with a variability of contact force between 0.43 and 0.76 N. Such a design may result, for example, from a design goal not to exceed the upper bound of 0.76 N. With a greater tolerance stackup, the expected variation in contact force would be greater, resulting in contact force above 0.76 N in some terminals, which could result in terminals that fail after fewer mating cycles. A greater tolerance stackup might also result in a contact force below 0.43 N in some terminals, which might result in contact force that is too low to support large currents. Accordingly, designs as described herein that provide low tolerance stackup result in more desirable terminals.

Using terminals as described herein, a connector may be simply constructed. The connectors may each include an insulative housing, which may, for example, be molded. The housings of the two connectors may include attachment features. For example, one of the housings may include a projection from a surface of the housing. A slot in the other housing may engage the projection to secure the coupling of the two connectors.

The stamped and bent metal sheets may be held in the housings, with a socket held in the housing of a receptacle connector and the pin held in the housing of a plug connector. The housing of a receptacle connector may have a chamber configured to receive a pin of the plug. The mating contact surface of the pin may extend around the pin and along the length of the pin in a direction in which the pin is inserted into the chamber for mating. The mating contact surface may be on at least the portions of the pin inserted into the chamber.

Optionally, the pin may include an insulative cap at its distal end. The cap may be tapered for lead-in to the chamber. If the housing is molded over the pin, the cap may be manufactured as a portion of the plug housing. In other examples, the cap may be an exposed portion of another insulative support.

Plating on the terminals of either or both of the connectors may provide reliable and low resistance connections between pin and socket terminals. The plating may be applied after terminal blanks are stamped from a metal sheet and before the blanks are formed into terminals. In some embodiments, mating contacts of one or more terminals may have a silver plating. In some embodiments, mating contacts of a connector may have a plating including a palladium nickel alloy base layer and a gold top layer. Applying the plating to a terminal blank stamped from a single conductive sheet enables the terminal to be selectively plated in a limited area, reducing the cost of plating.

In some embodiments, the receptacle connector and/or the plug connector may be included in an electrical assembly. The receptacle connector may be mounted to a first power cable or substrate and the plug connector may be mounted a second power cable or substrate. When the receptacle connector is mated with the plug connector, the receptacle connector and the plug connector couple to transmit electrical power between the first power cable or substrate and the second power cable or substrate.

Power connectors described herein may be used in conjunction with electric vehicles, for example. A receptacle connector and/or a plug connector as described herein may be included in an electric vehicle system. For example, one of the receptacle connector or the plug connector may be included in the electric vehicle while the other of the receptacle connector or the plug connector may be included at a battery or charging station for the electric vehicle. The electric vehicle may be charged by mating the receptacle connector with the plug connector to transfer electrical power from the charging station to the electric vehicle. In some embodiments, each of the electric vehicle and the charging station may respectively include a connector with more than one socket or pin terminals or may include a mix of the socket and pin terminals, which may increase a transfer rate of electrical energy between the charging station and the electric vehicle.

Referring now to FIGS. 1A-1D, a socket 100 is configured to receive a pin, such as pin 200 described below, in chamber 116, along insertion axis 104. Socket 100 may be formed from a blank 102 (FIG. 1B).

As illustrated in FIG. 1B, blank 102 may be a single stamped metal sheet. As a result blank 102 may be an electrically conductive monolithic member. Optionally, however, blank 102 may be an assemblage of multiple components, which may be stamped from the same metal sheet or produced in other ways.

The blank 102 may be constructed in a stamping operation. In such an operation, sheet metal, such as a copper alloy (for example, copper with a high IACS value, such as C18080 or C18070 R460), blank 102 is stamped from the metal sheet. The metal sheet may have a thickness of less than 1 mm, for example, a thickness in the range of 0.3 mm to 0.7 mm, such as about 0.5 mm.

In one example, a plurality of blanks 102 are stamped from a single sheet of material and are supported by a common carrier strip. Thus, the blanks 102 and the carrier strip may be monolithic with each other, and the carrier strip may be used for handling the blanks as they undergo other manufacturing operations such as plating and or forming into terminals. The individual terminals may then be separated from the carrier strip.

Figure 1A:
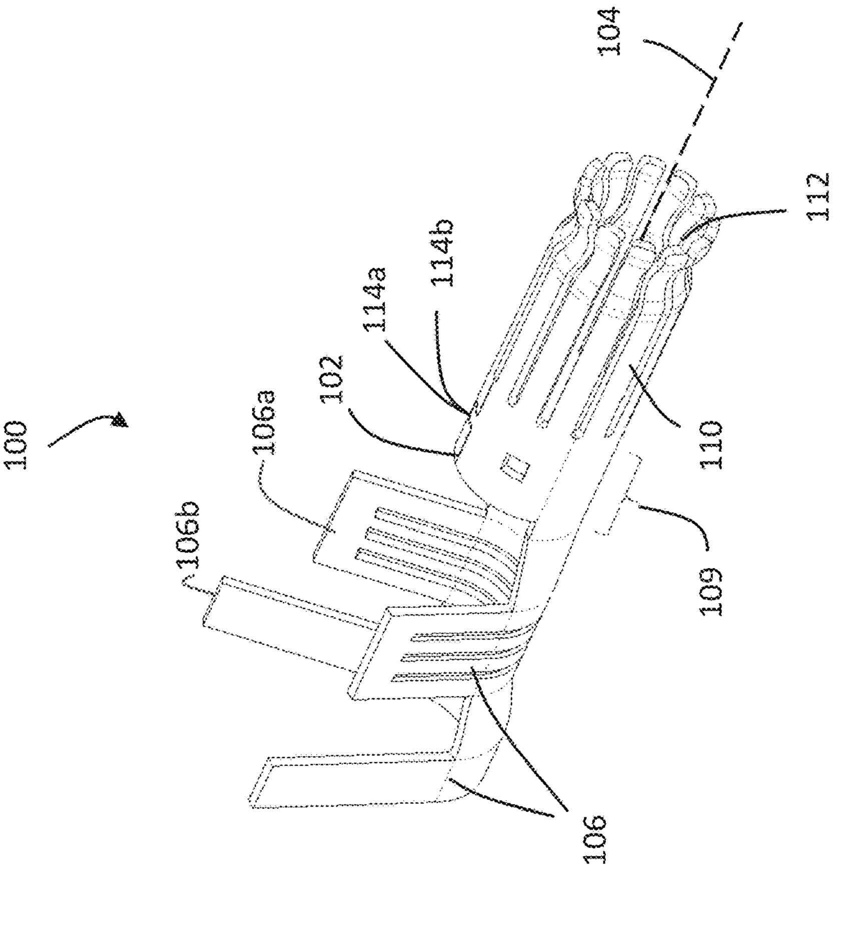
FIG. 1A is a perspective view of a terminal configured as a socket of an electrical connector.

As shown in FIG. 1B, the blank 102 may include a base 108 and mounting contacts 106 that extend from the base. Base 108 and mounting contacts 106 may be monolithic with each other. In the example of FIGS. 1A and 1B, the mounting contacts 106 are configured to couple the receptable 100 formed from blank 102 to a power cable. For example, the mounting contacts 106 may be bent around a conductive and/or insulative portion of a power cable to form an electrical connection with the power cable and/or to mechanically secure the receptable 100 to the power cable. In this example, mounting contact 106 includes wings *106a* and 106*b*, with wings 106*a* configured to wrap around an exposed conductor of a power cable and wings 106*b* configured to wrap around the insulator. Alternatively or additionally, mounting contact 106 may be configured to accept a weld joint to a cable. In other examples, the mounting contacts 106 may be configured for mounting to a substrate other than a cable. The mounting contacts 106 may be configured, for example, as post or press fits that may engage holes in a surface of a printed circuit board.

Figure 1D:
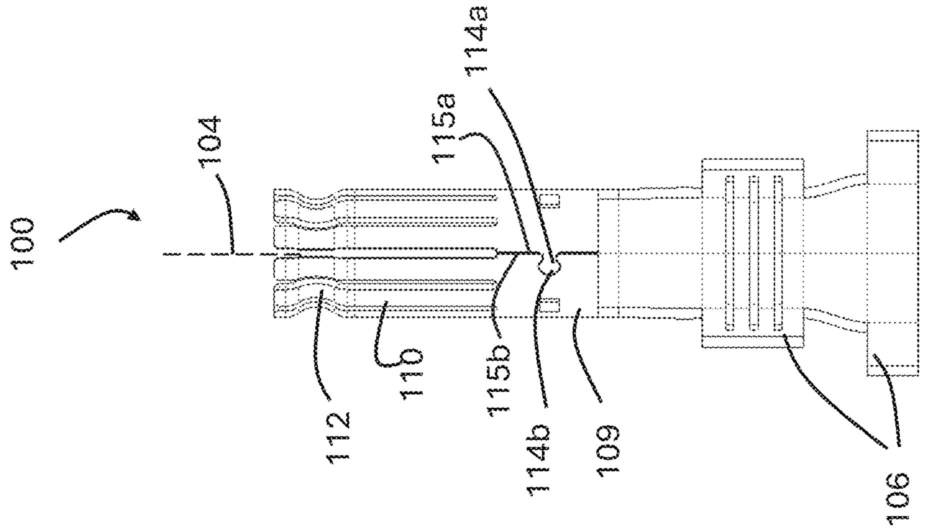
FIG. 1D is a top view of the socket of FIG. 1A.

The metal sheet 102 may also include one or more pairs of complementary engagement members 114*a* and 114*b* on opposite edges 115*a* and 115*b* of the base 108. Engagement member 114*a* may include a projection extending from the edge 115*a*. Engagement member 114*b* may include a notch in edge 115*b*. As illustrated in FIGS. 1A and 1D, when blank 102 is rolled to form socket 100, engagement member 114*a* may be inserted into and secured with engagement member 114*b* to hold the blank 102 in the formed shape.

In the configuration illustrated in FIGS. 1A and 1B, securing the complementary engagement members holds base 108 in a cylindrical barrel 109. Base 108 is secured with edges 115*a* and 115*b* abutting each other. Variation in the radius of barrel 109 contributes to the tolerance stackup impacting mating force and ultimately longevity of a socket and pin formed as described herein. Barrel 109 may be formed so as to contribute only a small amount to the tolerance stackup, reducing variation in mating force and providing terminals that can withstand more mating cycles. In this example, the circumference of cylindrical barrel 109 is determined based on the width, W, of blank 102. The width W is set during the stamping operation in which blank 102 was formed. Because stamping may be done with high precision, blank 102 can be stamped with little variation in width W, contributing little to the tolerance stackup.

The blank 102 further includes beams 110 that extend from the base 108. Base 108 and beams 110 may be monolithic with each other. The beams 110 may be straight from base 108 to mating contact 112. Here, the beams 110 are formed substantially parallel to the insertion axis 104 and substantially parallel to the walls of barrel 109. Forming the beams to be straight may reduce the tolerance stackup of receptable 100 because the bases of the beams are positioned by the circumference of the barrel 109, which is established with little variation. Further, straight beams with contact portions 112 formed at a distal end of the beam to produce interference with a mating terminal results in less variation than creating interference by bending the beams. Reducing variation reduces the tolerance stackup of socket 100 and may reduce the maximum contact force experienced by socket 100, which may in turn increase the lifespan of the receptable 100.

The beams 110 may be deflectable such that they deflect when the socket 100 is mated with a complementary pin. In some embodiments, the beams may be high aspect ratio beams. For example, a ratio of the length to the width of the beam may be between about 10:1 and about 8:1, or between about 9:1 and about 6:1, or about 9:1. In some embodiments, a ratio of the length to the thickness of the beam may be between about 27:1 and 8:1, between about 20:1 and 16:1 or between about 18:1 and about 12:1, or about 18:1.

Figure 1C:
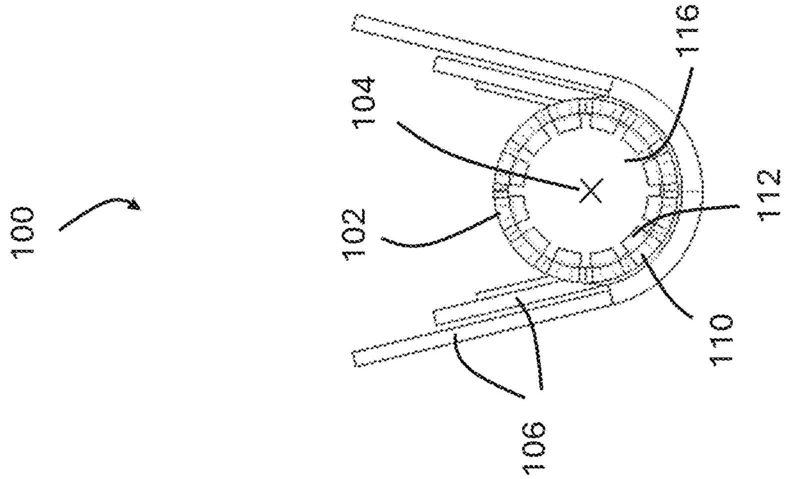
FIG. 1C is a front view of the socket of FIG. 1A.
Figure 1E:
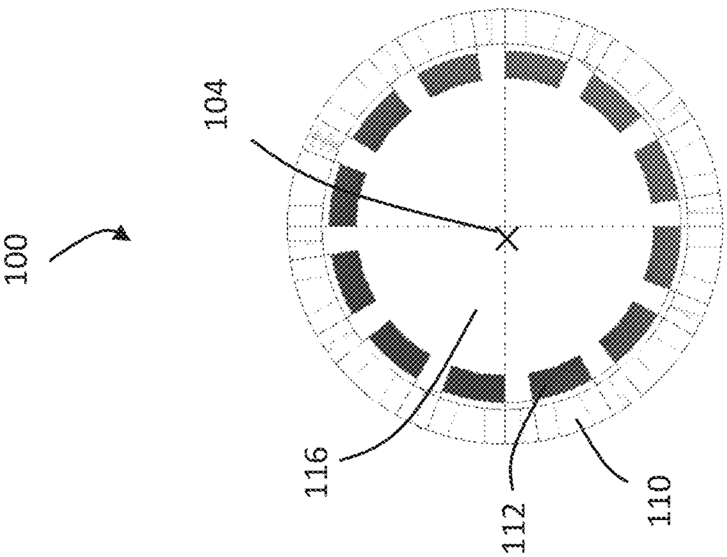
FIG. 1E is a detail front view of the socket of FIG. 1A, showing plated mating contact surfaces.
Figure 1F:
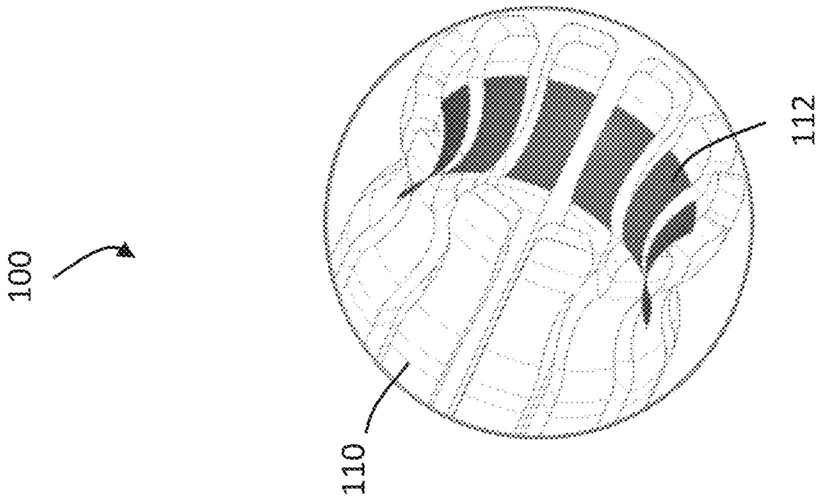
FIG. 1F is a detail perspective view of the socket of FIG. 1A, showing plated mating contact surfaces.
Figure 1G:
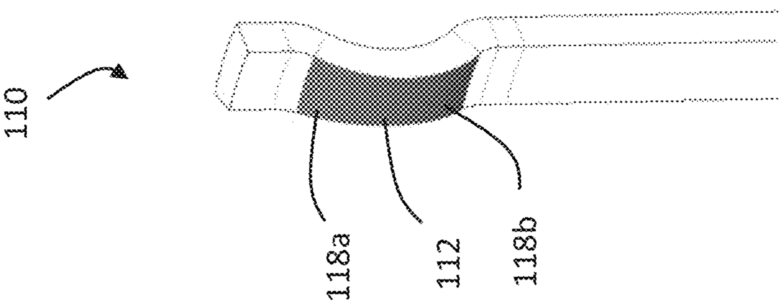
FIG. 1G is a detail perspective view of a beam of the socket of FIG. 1A, showing a plated mating contact surface.

Referring to FIGS. 1E-1G, each beam 110 includes a mating contact 112 that is configured to contact a complementary mating contact of a pin that is mated with the socket 100. For example, the complementary mating contact may be an outer surface of a pin, such as pin 200 (FIG. 2A). The mating contact 112 of each beam is located on an inner surface of the beam facing chamber 116 and insertion axis 104.

In some embodiments, receptable 100 may have a large number of beams 110 in order to reduce the contact force each beam 110 is subjected to while maintaining a high contact area. For example, in the illustrated embodiment of FIGS. 1A-1F, socket 100 includes 12 beams 110 and twelve respective mating contacts 112. However, the number of beams and mating contacts illustrated should be understood not to be limiting. In some embodiments, the socket 100 may include a different number of beams and mating contacts, for example, between 6 and 18 beams and respective mating contacts, between 8 and 16 beams and respective mating contacts, or between 10 and 14 beams and respective mating contacts. Typically, an increase of contact force between terminals provides an increase of current that may be transferred between the terminals. By providing a large number of beams 110, a larger number of mating contacts 112 may be mated with mating contact 212, which may allow the contact force applied by each beam to be reduced while still allowing a large amount of current to be transferred between the mated terminals.

As shown in FIG. 1G, each mating contact 112 is formed on an end of a beam 110 distal the base 108. The beam 110 and the mating contact 112 may be monolithic with each other. The mating contact 112 is configured to contact a complementary mating contact that is mated with the socket 100. As shown in FIG. 1G, the mating contact 112 may be formed on an arcuate segment formed into the beam 110. The arcuate segment may for example comprise a semicircular arc.

The arcuate segment of mating contact 112 formed into the beam may extend towards the insertion axis 104 to create interference with a mating terminal. For example, the socket 100 including mating contact 112 may receive mating contacts of pin 200. The mating contact 112 is disposed on an inner side of the beam 110. The inner side of the beam 110 faces the chamber 116 and the insertion axis 104.

The arcuate segment of mating contact 112 may be formed with low tolerance stackup even though the arcuate segment is not straight. As noted above, beams 110 are formed straight to reduce tolerance stackup of socket 100. In contrast, the arcuate segment can have its shape established by permanent deformation of the beam 110, with that shape set by the tools used in the deforming operation. Were a beam bent rather than straight and parallel to the insertion axis, when the beam is released from the tool used in such a bending operation, the beam may spring back to partially return towards its shape prior to bending. Therefore, the tool used in such a bending operation must be designed to target the desired position where the beam springs back to partially return towards its shape prior to bending, which introduces additional tolerance stackup. This additional tolerance stackup present for a bent beam may not be present for a permanently deformed arcuate segment of a mating contact 112.

Each mating contact 112 may include plating. The plating may provide a softer surface than a substrate material of the beam 110. For example, the plating material may provide a softer surface than the material of the metal sheet. The surface provided by plating may enable a better electrical connection because it is resistant to oxidation. Such oxidation would form insulation on the base metal of the mating contacts. By providing a plated surface resistant to oxidation on the base metal, the terminal may provide a lower contact resistance for a same amount of contact force. However, because surfaces resistant to oxidation conventionally are softer than the base metal, such surfaces may wear off over repeated mating cycles, particularly when contact force is high. According to aspects of the disclosure, a low contact force is provided to prevent oxidation resistant plating from wearing off over repeated mating cycles, which increases the lifespan of terminals while providing low contact resistance.

In some embodiments, an entire surface of blank 102 may be plated. In some embodiments, plating may be selectively applied only at mating contacts 112 to reduce the amount of plating and therefore reduce the cost of plating the socket 100. In some embodiments, the plating may comprise a silver plating or may comprise a base layer of a palladium nickel alloy and a top layer of gold.

The mating contact 112 may be bent to include a first side 118*a* disposed at the end of mating contact 112 furthest from base 108, and a second side 118*b* disposed between the first side 118*a* and the base 108. The first side 118*a* and the second side 118*b* may be oriented at an angle relative to each other. In one example, the first side 118*a* may be angled such that the distance between mating contact 112 and insertion axis 104 becomes larger along the mating contact 112 in a direction away from base 108. In the example, the second side 118*b* may be angled such that the distance between mating contact 112 and insertion axis 104 becomes smaller along the mating contact 112 in a direction away from base 108. For example, as shown in FIGS. 1E-1G, the mating contact 112 may be bent so that first side 118*a* and second side 118*b* form an arc with an apex of the arc provided where the first side 118*a* and second side 118*b* join.

As shown in FIGS. 1C and 1E, the plurality of beams 110 and mating contacts 112 may be arranged along a circle. The circle may be arranged around the perimeter of the chamber 116 and may be perpendicular to the insertion axis 104 of the socket 100. In some embodiments, the beams 110 and mating contacts 112 may be arranged in a shape other than a circle, for example, a rectangle or square.

Figure 2B:
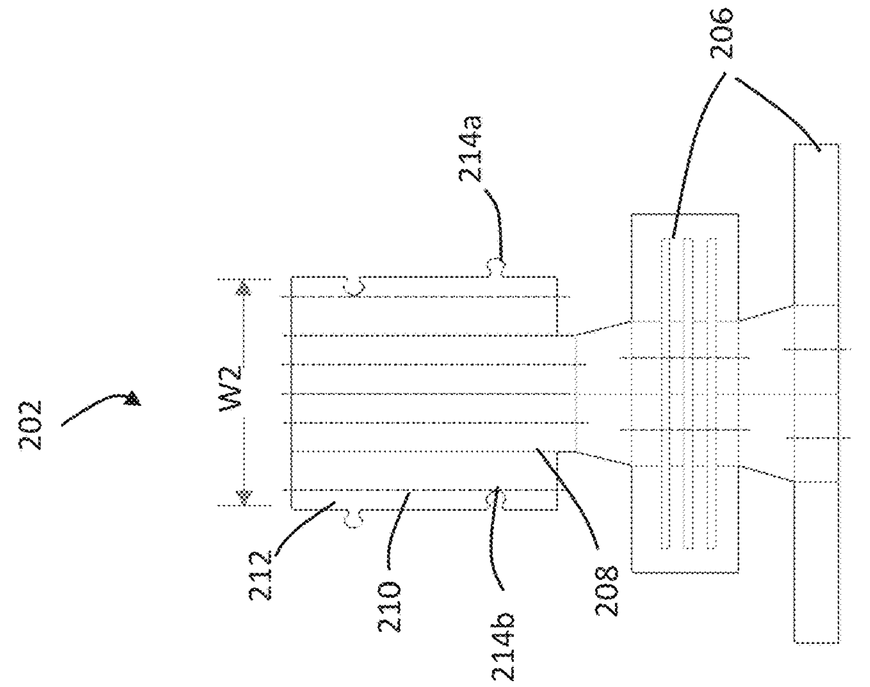
FIG. 2B is a top view of a metal sheet that may be formed into the pin of FIG. 2A.
Figure 2A:
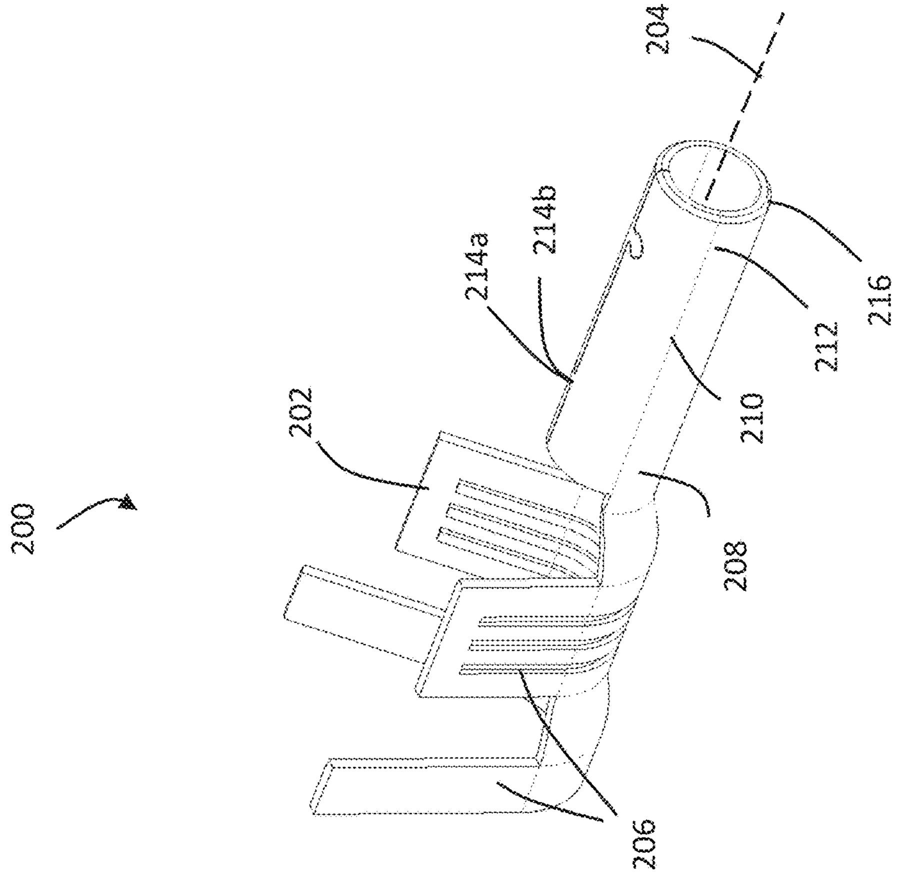
FIG. 2A is a perspective view of a terminal configured as a pin of an electrical connector and configured for mating with the socket of FIG. 1A.

Referring now to FIGS. 2A-2B, a pin 200 is configured to be inserted, along insertion axis 204 into a socket, such as socket 100 described above. Pin 200 may be formed from a blank 202, which may be stamped from a metal sheet similar to blank 102 described above with respect to FIG. 1B. As shown in FIG. 2B, blank 202 may include a base 208, and mounting contacts 206 that extend from the base similar to mating contacts 106 described above. Blank 202 also includes engagement members 214*a* and 214*b*, similar to engagement members 114*a* and 114*b* described above. As illustrated in FIGS. 2A-2B, blank 202 includes two pairs of engagement members 214*a* and 214*b*. However, edges of blank 202 may be held together with more or fewer engagement features. In some examples, the edges of a blank, such as blank 202, may be welded together without engagement features. The edges of a blank, such as blank 202, may alternatively be held together without engagement features, welding, or other retention features. For example, a terminal may hold shape due to permanent deformation of the metal sheet that forms the terminal, or a pin terminal may hold shape due to retention force of a receptacle terminal.

Blank 202 differs from blank 102 described above in that blank 202 includes a body 210 that extends from the base 208 rather than including beams 110. Base 208 and body 210 may be monolithic with each other. The body 210 may be straight and formed to be substantially parallel to the insertion axis 204. Forming the body to be straight (rather than bent) may reduce the tolerance stackup of pin 200. As with the stamping techniques described in connection with blank 102, the edges of blank 202 are separated by a width W2, which can be controlled with high precision. When blank 202 is formed into a terminal, as shown in FIG. 2A, the circumference of mating contact 212 is determined by width W2. As a result, there is high precision on the circumference, and therefore the radius, of mating contact 212, yielding allow tolerance stackup.

Referring to FIG. 2A, the body 210 includes a mating contact 212 that is configured to contact complementary mating contacts of a socket that is mated with the pin 200. For example, the complementary mating contacts may be the inner surfaces of beams of a socket, such as socket 100. In the example illustrated, width W2 is smaller than width W such that the radius of mating contact 212 is less than the radius of chamber 116, such that pin 200 including mating contact 212 may be received in socket 100. Optionally, the distal edge of pin 200 may be worked, such as by coining or milling, to be chamfered and to facilitate insertion into socket 100. The mating contact 212 may be an outer surface of the body 210 facing away from insertion axis 204. The mating contact 212 may be on an end of the body 210 that is distal base 208.

As shown in FIG. 2A, the body 210 and the mating contact 212 may be arranged along a circle. The circle may be arranged around the insertion axis 204 of the pin 200. In some embodiments, the body 210 and mating contact 212 may be arranged in a shape other than a circle, for example, a rectangle or square. Mating contact 212 may be plated similarly to mating contacts 112, as described above.

Adjacent to mating contact 212, pin 200 may include an angled portion 216. Angled portion 216 may be configured to deflect beams 210 of socket 100 when pin 200 is inserted into socket 100.

Figure 3A:
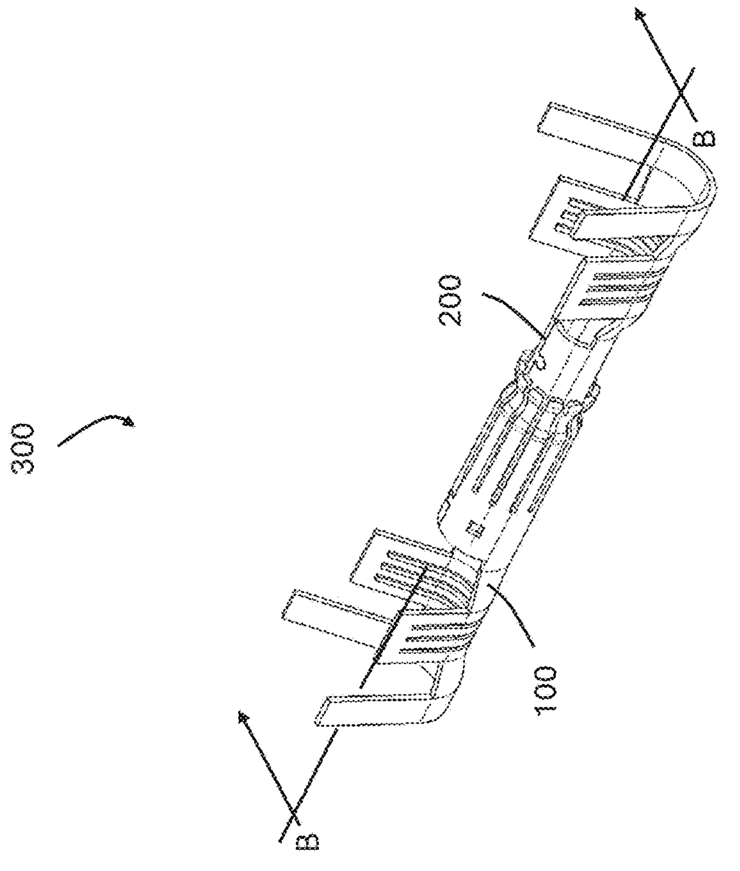
FIG. 3A is a perspective view of the socket of FIG. 1A mated with the pin of FIG. 2A.
Figure 3B:
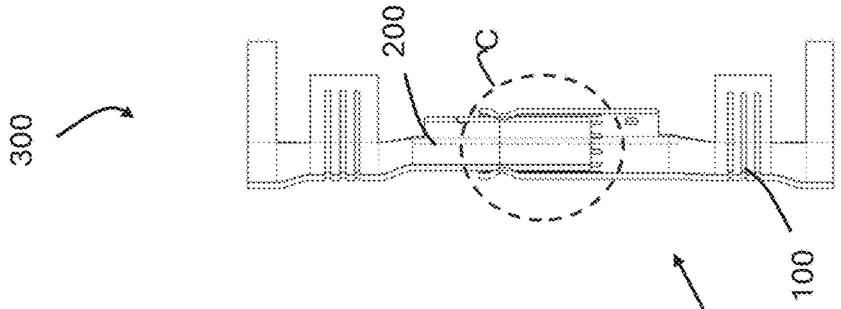
FIG. 3B is a cross section along the line B-B of the mated socket and pin of FIG. 3A.
Figure 3C:
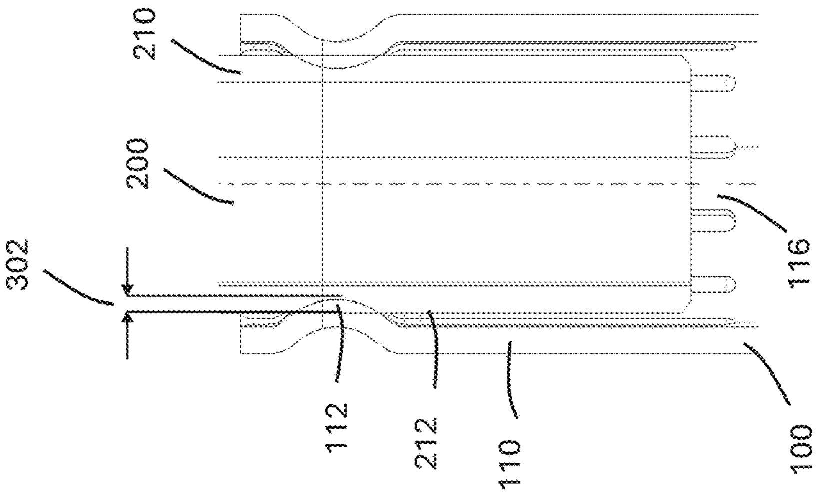
FIG. 3C is a detail view of the region C of the cross section of the mated socket and pin of FIG. 3B.

Referring now to FIGS. 3A-3C, an electrical system 300 includes socket 100 and pin 200, which are shown mated to form an electrical connection between the socket 100 and the pin 200. While cables are not illustrated in FIGS. 3A-3C, each of receptable 100 and pin 200 may respectively be coupled to a cable or other substrate so as to put the two cables or other substrates into electrical communication with each other. The electrical connection between socket 100 and pin 200 may be used to transfer power between the socket 100 and pin 200. The electrical system 300 may be used in scenarios in which a conventional cylindrical metal pin and socket systems have been used, but may be more economically manufactured, have long lifespan, transfer high current, and support additional functions of an electrical system. Current carrying capacity of the mated terminals may be determined based on temperature rise. Current carrying capacity of the terminals may be rated, for example, in terms of the number of Amps of current that can flow through the mated terminals without causing an increase in temperature above a threshold amount, such as 30 degrees C. above ambient temperature. Longevity in terms of mating cycles of the terminals for a power connector may also be determined based on temperature rise, indicating the number of mating cycles that the terminals can endure before the temperature rise exceeds the threshold amount. These quantities may be measured directly or may be measured indirectly, such as by measuring the resistance through the terminal.

When socket 100 is mated to pin 200, the body 210 of pin 200 is inserted into chamber 216 of socket 100. Socket 100 and pin 200 are formed so that mating contacts 112 engage the mating contacts 212 during insertion.

The mating contacts 112 of socket 100 are positioned such that as mating contact 212 of pin 200 is inserted, the mating contact 212 may be wiped by mating contacts 112 thereby establishing suitable electrical connection between the mating contacts 112 and mating contacts 212. As shown in FIGS. 3B-3C, pin 200 has been fully inserted into socket 100. While deflection is not illustrated in FIGS. 3B-3C, as pin 200 is inserted into socket 100, beams 110 are deflected. Since beams 110 may be stamped from metal, the deflection of beams 110 may result in a spring force for beams 110 to return to their initial position. This force contributes to the resulting wiping of mating contacts 112 of socket 100 against the mating contacts 212 of pin 200 thereby establishing an electrical connection between socket 100 and pin 200.

As shown in FIG. 3C, when socket 100 is mated with pin 200, the mating contacts 112 on the ends of beams 110 of socket 100 are in electrical contact with the mating contact 212 on the end of body 210 of pin 200. Socket 100 and pin 200 may be configured such that when socket 100 and pin 200 are coupled together, each mating contact 112 has an interference 302 with the mating contact 212. The interference 302 may be equal to the amount by which the outer radius of the mating contact 212 is greater than the inner radius of each mating contact 112. For purposes of illustrating the interference 302, FIG. 3C does not illustrate beams 110 as deflecting and instead shows mating contacts 112 overlaid on mating contact 212. When the socket 100 is mated with the pin 200, each beam 110 may be deflected at the mating contact 112 by an amount equal to interference 302. In some embodiments, socket 100 and pin 200 may be formed such that the magnitude of the interference between socket 100 and pin 200 is low, to provide a low contact force. For example, the pin 200 may be formed to have an outer diameter between about 3.0 and about 6.0 mm, or about 4.8 mm. The socket 100 may be formed to have, with the pin 200, an interference 302 between radii of less than about 0.25 mm, between about 0.05 and about 0.225, between about 0.1 and about 0.175 mm, about 0.1 mm, or about 0.175 mm. By reducing the interference between the socket 100 and the pin 200, the contact force between the mating contacts 112 and mating contact 212 may be reduced, which may increase the longevity of the socket 100 and/or pin 200.

The beams 110 may be configured to only be subjected to stresses far below the elastic limit of the beams 110. Exposing beams 110 to only stresses below the elastic limit of the beams 110 may reduce the set that occurs in the beams 110 and provide a lower likelihood that the beams 110 will crack. In some embodiments, the beams 110 may reach an elastic limit when the beams 110 are subjected to a deflection on 0.5 mm. Accordingly, by providing socket 100 and pin 200 having an interference 302 of less than about 0.25 mm, or any of the other interferences described above, it may be ensured that the beams 110 are only subject to stresses far below the elastic limit of the beams. Exposing the beams 110 to stresses below the elastic limit of the beams 110 may reduce the likelihood that the beams 110 crack and increase the longevity of the beams 110.

The magnitude of interference 302 provides the contact force between mating contacts 112 and mating contact 212. In some embodiments, the contact force exerted by each beam may be less than about 1.0 N, between about 0.1 and about 1.0 N, between about 0.43 and about 0.76 N, about 0.43 N, or about 0.76 N.

The interference 302 may be such that the contact force between mating contacts 112 and mating contacts 212 is sufficiently low that socket 100 and pin 200 may endure 10,000 mating cycles. Accordingly, the interference 302 may provide high longevity of the socket 100 and pin 200.

Figure 4:
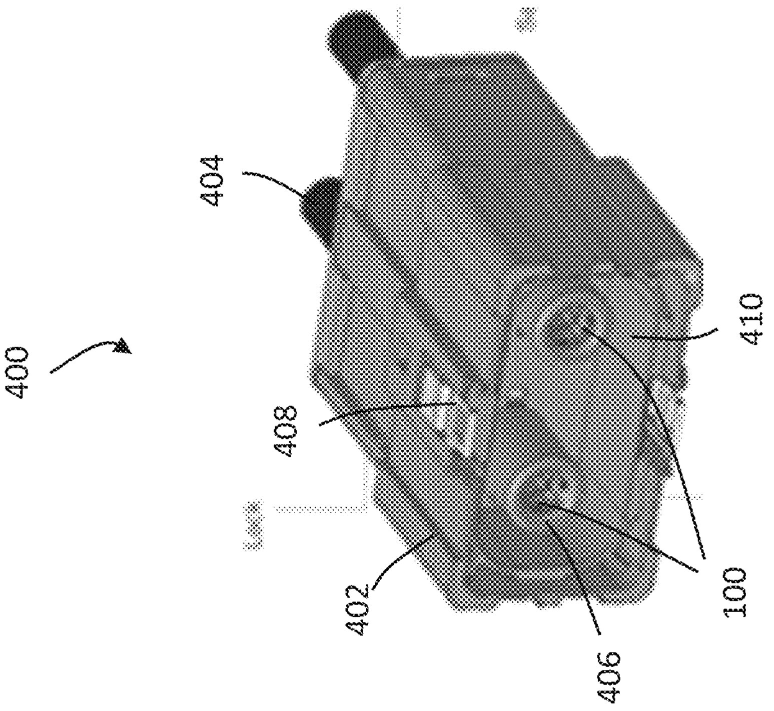
FIG. 4 is a perspective view of an electrical connector that includes the socket of FIG. 1A.

FIG. 4 shows connector 400 including two sockets 100. Connector 400 includes a housing 402. The material of housing 402 may be insulative, and may for example be formed from a dielectric, such as plastic filled with reinforcing glass fibers. In the illustrated embodiment, two sockets 100 are supported by housing 402. The housing 402 includes a chamber 410 configured to receive a complementary connector, which may be connector 500 described below. The housing 402 is shaped to surround the sockets 100 except at openings 406.

In the example illustrated, each of the openings 406 is sized to permit passage of a pin, such as pin 200, described above, into the opening 406. Opening 406 may be chamfered so as to locate and center a pin being inserted into connector 400. Opening 406 may be centered with the insertion axis 104 of a socket 100 held within hosing 402 with distal ends of the beams 110 positioned around opening 406. A pin, such as pin 200, may be inserted into socket 100 along the insertion axis 104 at the opening 406.

In the illustrated embodiment, the housing 402 supports two power cables 404 which are respectively coupled to the two sockets 100. Housing 402 may also include an engagement member configured to couple the housing 402 to a housing of a complementary connector. As shown in FIG. 4, housing 402 includes as an engagement member, latch 408. Latch 408 is configured to couple with a complementary projection of a complementary connector. Latch 408 includes a hooked portion to engage the complementary projection. In some embodiments, the latch may include a button which may be actuated to release the latch and allow the connector housings to be separated.

Figure 5:
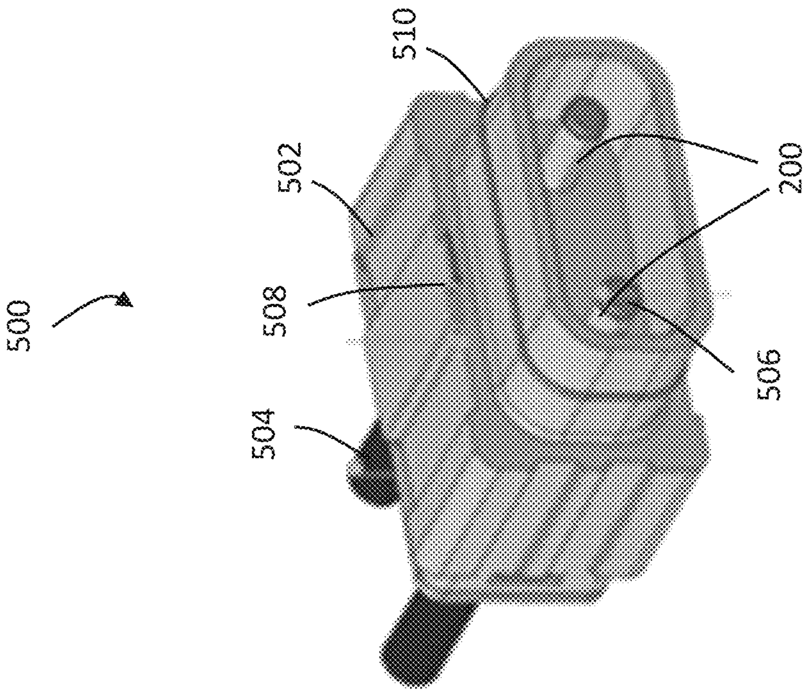
FIG. 5 is a perspective view of an electrical connector that includes the pin of FIG. 2A.
Figure 6D:
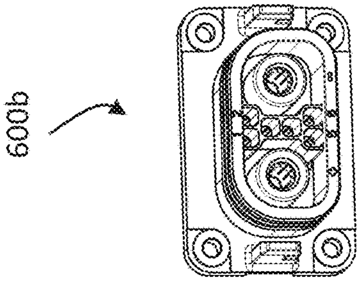
FIGS. 6A, 6B, 6C, and 6D are perspective views of another exemplary plug and receptacle connector, respectively, configured to mate.
Figure 6C:
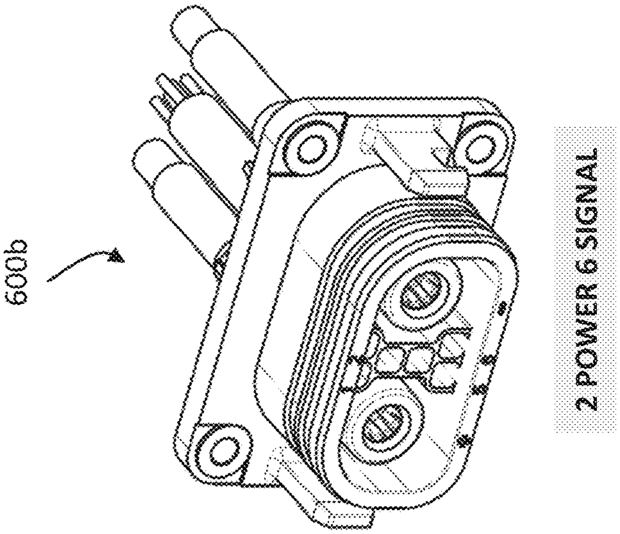
Figure 6B:
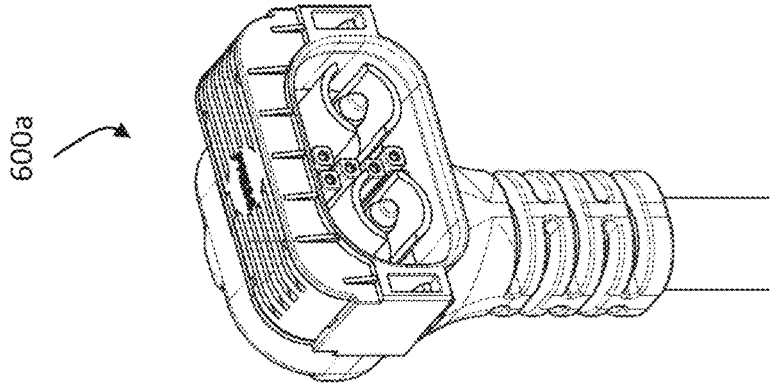
Figure 6A:
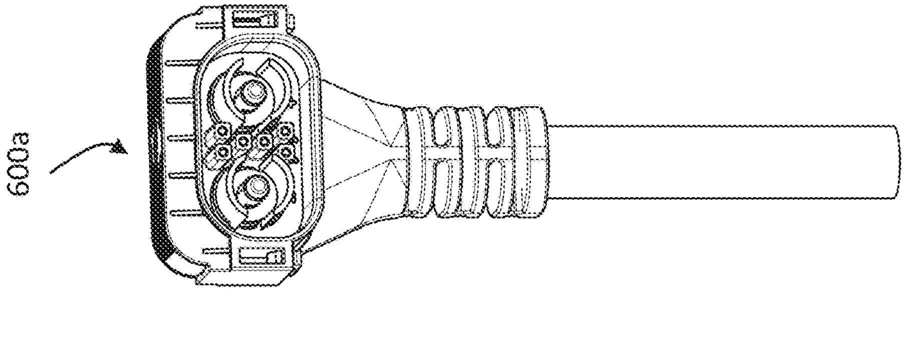

FIG. 5 shows connector 500. Connector 500 may differ from connector 400 in that housing 502 of connector 500 is configured to support two pins 200 rather than sockets 100. Connector 500 also differs from connector 400 in that connector 500 includes an insulative cap 506 at an end of each pin 200 instead of including an opening 406. Insulative cap 506 comprises a small length of tapered insulative material. Insulative cap 506 is tapered so as to locate and center each pin 200 pin being inserted into openings 406, as well as to provide protection against direct finger contact on live terminals.

As for connector 400, housing 502 supports two power cables 504 which are respectively coupled to the two pins 200. As shown in FIG. 5, housing 502 includes as an engagement member, here illustrated as projection 508. Projection 508 is configured to couple with latch 408 and its lock. Connector 500 also includes a seal 510. Seal 510 surrounds an outer surface of housing 502. When connector 500 is mated with connector 400, the seal 510 presses against the surface of chamber 410, sealing the chamber 410. Sealing the chamber 410 may reduce or eliminate introduction of liquids or other debris to the receptable 100, pin 200, or other components of connector 400 and connector 500.

While connector 400 and connector 500 are illustrated as including either two of socket 100 or two of pin 200, this should be understood not to be limiting. In some embodiments, a connector may include another number of sockets 100 or pins 200, such as one, three, or more of sockets 100 or pins 200. In addition, in some embodiments one connector may include a mix of sockets 100 and pins 200. For example, connector 400 or connector 500 may instead each include one socket 100 and one pin 200.

Electrical connectors described herein may be configured to transfer power at high currents. For example, in some embodiments, electrical connectors described herein may transfer power at currents greater than or about 50 A, greater than 70 A, or about 75 A in various examples.

FIGS. 6A, 6B, 6C, and 6D show another exemplary plug and receptacle connector that are configured to mate with each other. Plug connector 600*a* and receptacle connector 600*b* shown in FIGS. 6A, 6B, 6C, and 6D may be formed from similar materials and according to similar techniques as described with respect to connector 400 and connector 500 shown in FIGS. 4 and 5. Plug connector 600*a* and receptacle connector 600*b* may differ from connector 400 and connector 500 in various respects. For example, plug connector 600*a* includes two latches located on opposite sides outside of the terminals of plug connector 600*a* and receptacle connector 600*b* includes two corresponding projections located on opposite sides outside of the terminals of receptacle connector 600*b*. The latches and projections are configured to engage and secure plug connector 600*a* with receptacle connector 600*b* when plug connector 600*a* and receptacle connector 600*b* are mated. An actuator located along a top surface of plug connector 600*a* may be depressed to release the latches of connector 600*a* so that plug connector 600*a* and receptacle connector 600*b* may be released from engagement. Plug connector 600*a* and receptacle connector 600*b* are illustrated as including six signal terminals in addition to two power terminals. As shown in FIGS. 6A, 6B, 6C, and 6D, the signal terminals may be disposed between the two power terminals. Plug connector 600*a* may also include openings formed around power terminals of plug connector 600*a*. The openings may comprise circular segments having gaps formed therein. Additionally, plug connector 600*a* is illustrated as including a single cable including wires coupled to each of its terminals.

Figure 7A:
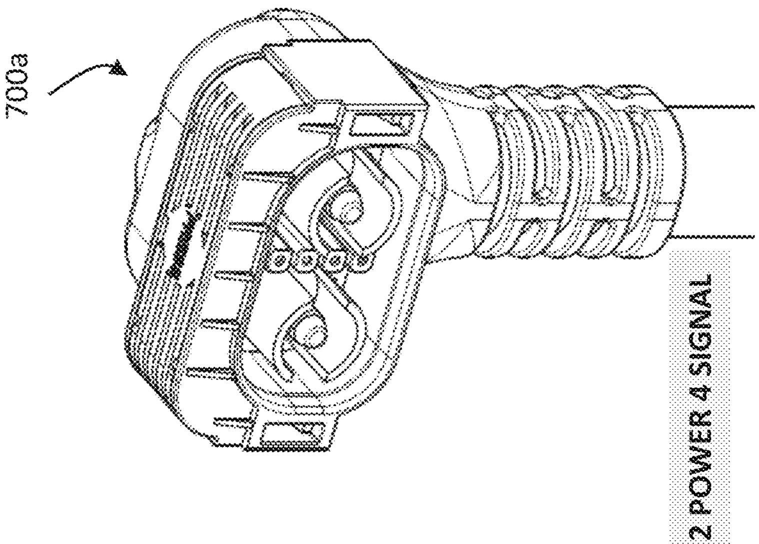
FIGS. 7A and 7B are perspective views of another exemplary plug and receptacle connector, respectively, configured to mate.
Figure 7B:
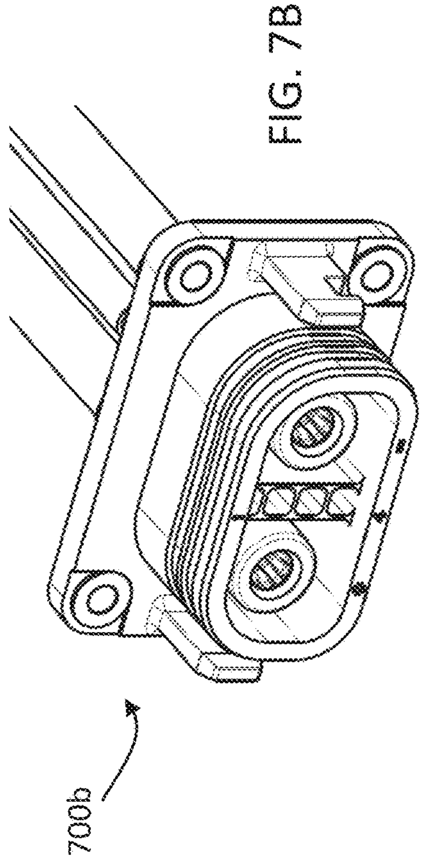

FIGS. 7A and 7B show another exemplary plug and receptacle connector that are configured to mate with each other. Plug connector 700*a* and receptacle connector 700*b* shown in FIGS. 7A and 7B may be formed from similar materials and according to similar techniques as described with respect to plug connector 600*a* and receptacle connector 600*b* shown in FIGS. 6A, 6B, 6C, and 6D. For example, plug connector 700*a* and receptacle connector 700*b* are illustrated as including four signal terminals in addition to two power terminals.

Figure 8:
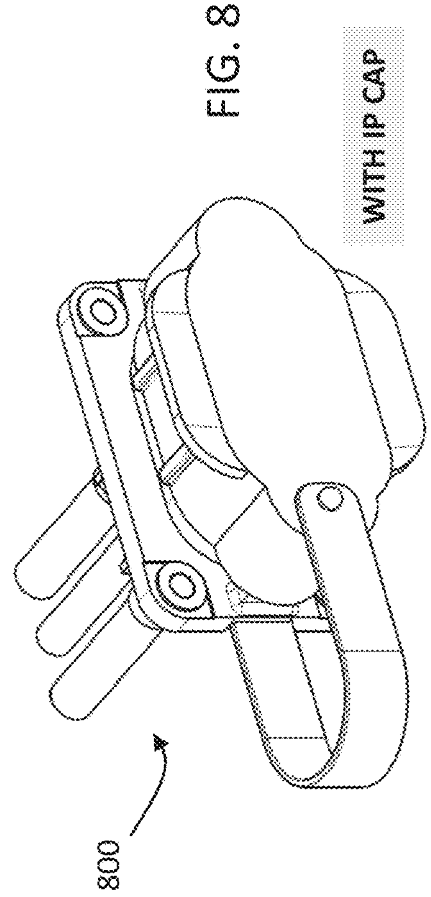
FIG. 8 is a perspective views of exemplary receptacle connector, with a cap.

FIG. 8 shows a receptacle connector 800 with a cap. Receptacle connector 800 shown in FIG. 8 may be formed from similar materials and according to similar techniques as described with respect to receptacle connector 600*b* shown in FIGS. 6C and 6D. When receptacle connector 800 is not in use, the cap may be affixed to receptacle connector 800 so that it covers the terminals of receptacle connector 800. A user may affix the cap. In some embodiments, the cap may have two latches which engage with complementary projections located on opposite sides outside of the terminals of receptacle connector 800. In other embodiment, the cap may be engaged with receptacle connector 800 by a friction fit. When affixed, the cap may prevent ingress of objects to the terminals and/or may prevent user contact with the terminals of the receptacle connector 800. The cap may be coupled with a leash coupled to receptacle connector 800 so that the cap remains coupled to the receptacle connector 800 when the cap is not affixed covering the terminals of receptacle connector 800.

Figure 9:
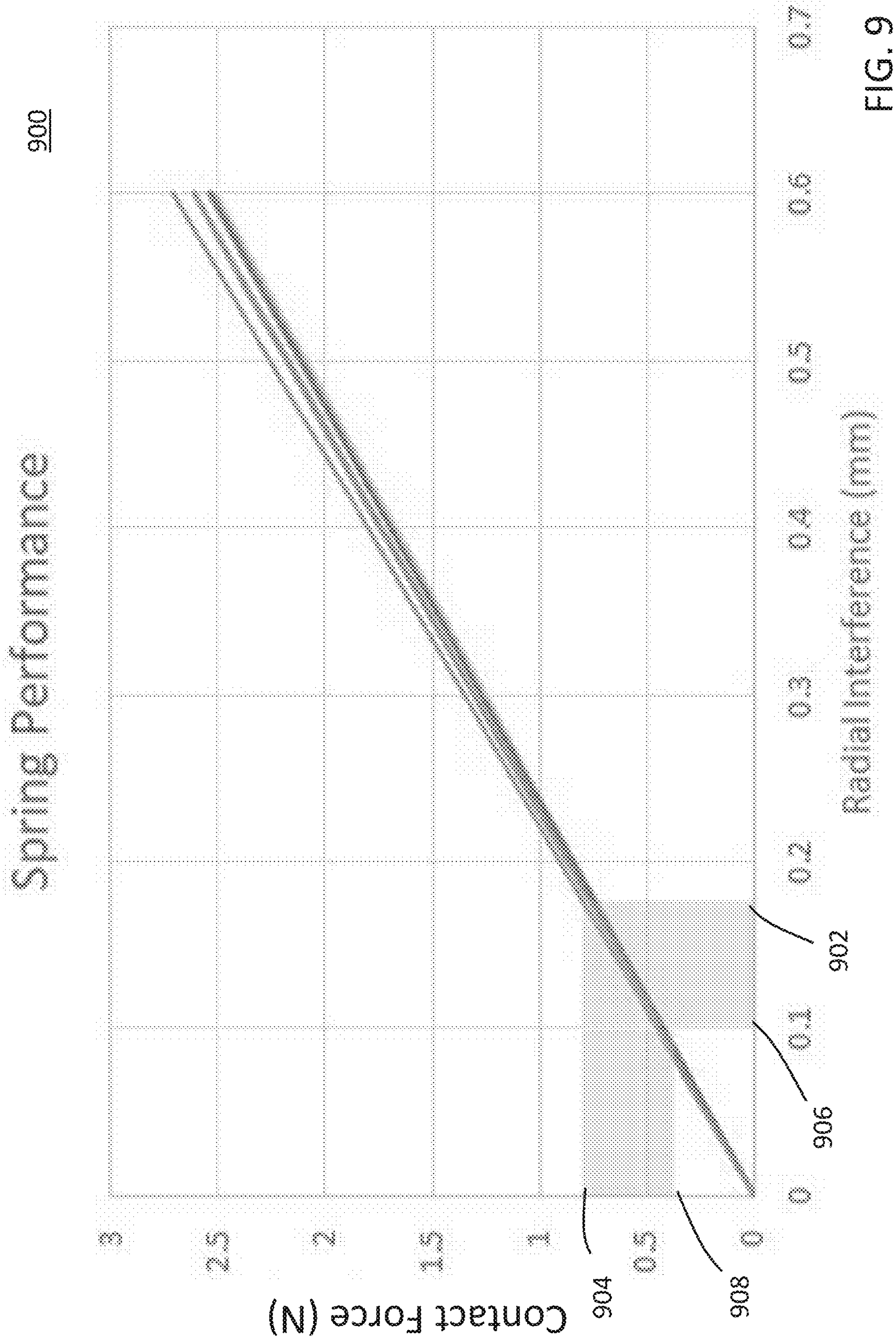
FIG. 9 is a plot illustrating contact force as a function of radial interference for the mated socket and pin of FIG. 3A, highlighted to show a designed range of contact force that supports high current and high mating cycles with a range of radial interference to provide these terminal characteristics.

FIG. 9 is a plot 900 illustrating contact force as a function of radial interference for the mated socket 100 and pin 200 shown in FIGS. 3A-3C. The range of radial interference corresponds to the tolerance stackup for the mated socket and pin, with the socket and pin configured to provide acceptable contact force regardless of actual amount of radial interference for any pin and socket combination manufactured with a process yielding that tolerance stackup. Plot 900 is highlighted to show a designed range of contact force that supports high current and high mating cycles, and the designed range of radial interference that corresponds to that desired range of contact force.

Socket 100 and pin 200 may be designed such that metal portions of the terminals are only subjected to stresses far below the elastic limit of the metal while still providing adequate contact force. In the example shown in FIG. 9, the metal portions of the terminals may reach an elastic limit when subjected to a deflection of 0.5 mm. Accordingly, in the example shown in FIG. 9, the terminals are provided having an interference less than about 0.25 mm, which may ensure that the metal portions of the terminals are only subject to stresses far below the elastic limit. For example, the deflection may be less than 50% of the deflection at the elastic limit, or less than 40%, or between 20-40%, or around 35% in some examples. As a specific example, FIG. 9 indicates a maximum designed interference 902 of about 0.175 mm, which provides a maximum designed contact force 904 of about 0.76 N. The minimum designed interference 906 is about 0.1 mm, which provides a minimum designed contact force 908 of about 0.43 N. The maximum designed interference 902 of about 0.175 mm is far below the deflection of 0.5 mm at which the metal portions of the terminals reach their elastic limit.

The interference range between maximum designed interference 902 and minimum designed interference 906 may be designed to correspond to the low total tolerance stackup of the connectors that include the socket 100 and pin 200. In the example shown in FIG. 9, this total tolerance stackup may be about 0.33 mm. Each of the tolerances discussed herein may contribute to this low total tolerance stack up, including, for example, straight cylindrical terminal bodies formed from blanks having edges with stamped widths, straight beams rather than beams having a bend over a long length, and mating contacts formed on arcuate segments having their shape established by permanent deformation.

Having thus described at least one embodiment, it is to be appreciated various alterations, modifications, and improvements may readily occur to those skilled in the art. Such alterations, modifications, and improvements are intended to be within the spirit and scope of the application. Accordingly, the foregoing description and drawings are by way of example only. Various changes may be made to the illustrative structures, materials and processes shown and described herein.

For example, certain electrical connectors are shown with mounting portions configured to couple to electrical cables. Other mounting portions, such as pressfit tails, surface mount or plated through hole soldered connections may be used instead.

As another example, mating terminals are illustrated as a socket and a pin, respectively. In such a configuration, all portions of the terminals that deflect are a portion of the socket and the shape of the pin is static during mating. It is not necessary that all deflecting portions be on one terminal. Each terminal, for example, may have beams that deflect during mating. An outer terminal may have beams with inwardly facing contact surface and the inner terminal may have beams with outwardly facing contact surface. The beams of one terminal may align with static contact surfaces on the other terminal, in some implementations. In yet other implementations, beams of one terminal may align with beams of the other terminal such that the contact force may be the sum of the force generated by deflecting beams of both terminals.

As a further example, FIGS. 1A and 2A illustrate terminals including a portion of a metal sheet formed into a cylinder with a circular cross section. Techniques as described herein may be applied to terminals in which a portion of a metal sheet is formed into a hollow portion by joining edges of the sheet. The hollow portion may have a cross section other than a circle. As a specific example, the cross section may be an oval or rectangular, such as a square.

Terms signifying direction, such as "upwards" and "downwards," were used in connection with some embodiments. These terms were used to signify direction based on the orientation of components illustrated or connection to another component, such as a surface of a printed circuit board to which a termination assembly is mounted. It should be understood that electronic components may be used in any suitable orientation. Accordingly, terms of direction should be understood to be relative, rather than fixed to a coordinate system perceived as unchanging, such as the earth's surface.

Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Examples of arrangements that may be implemented according to some embodiments include the following:

1. A power terminal for an electrical connector, the terminal having an insertion axis and comprising:
   a metal sheet comprising:
      a hollow portion comprising a portion of the sheet formed around the insertion axis;
      a mounting contact coupled to the hollow portion;
      a mating contact on an exterior portion of the hollow portion.

2. The terminal of example 1, wherein:
   the portion of the metal sheet formed into the hollow portion comprises a first edge and a second edge; and
   the portion of the metal sheet is formed such that the first edge is adjacent to the second edge.

3. The terminal of example 2, wherein:
   the first edge comprises a first engagement member;
   the second edge comprises a second engagement member; and
   the first engagement member is engaged with the second engagement member.

4. The terminal of example 3, wherein:
   the first edge abuts the second edge.

5. The terminal of example 2, wherein:
   the metal sheet comprises a distal edge perpendicular to the first edge and the second edge; and
   the distal edge of the sheet is coined such that the distal end of the hollow portion is chamfered.

6. The terminal of example 1, further comprising:
   plating selectively covering the mating contact.

7. The terminal of example 1, wherein:
   the hollow portion is a cylindrical barrel and the outer diameter of the barrel is between 3.6 and 4.8 mm.

8. The terminal of example 1, further comprising:
   an insulative cap inserted into the hollow portion.

9. The terminal of example 1, wherein:
   the terminal comprises a pin; and
   the metal sheet is a single, integral sheet.

10. The terminal of example 1, wherein:
   the hollow portion has a rectangular cross section.

11. A power terminal for an electrical connector, the terminal having an insertion axis and comprising:
   a metal sheet comprising:
      a base comprising a portion of the sheet formed around the insertion axis;
      a mounting contact coupled to the base;
      a plurality of deflectable beams extending from the base parallel to the insertion axis, wherein:
         each deflectable beam of the plurality of deflectable beams comprises a mating contact;
         the plurality of deflectable beams are arranged around the insertion axis; and
         the mating contact of each deflectable beam faces the insertion axis.

12. The terminal of example 11, wherein the plurality of deflectable beams are arranged in a circle around the insertion axis.

13. The terminal of example 11, wherein each deflectable beam extending from the base parallel to the insertion axis comprises a straight beam with the mating contact formed at a distal end of the straight beam.

14. The terminal of example 11, wherein each deflectable beam extending from the base parallel to the insertion axis comprises a straight beam with an arced segment and the mating contact is on the arced segment.

15. The terminal of example 11, wherein:
   the base comprises a portion of the metal sheet comprising a first edge and a second edge separated by a width; and
   the portion of the metal sheet is rolled into a barrel with the first edge adjacent to the second edge.

16. The terminal of example 11, wherein the terminal is configured to undergo 10,000 mating cycles with a complementary power terminal.

17. The terminal of example 11, wherein the metal sheet has a thickness of between 0.3 and 0.7 mm.

18. The terminal of example 11, wherein the metal sheet has a thickness of about 0.5 mm.

19. The terminal of example 11, wherein a ratio a length of each deflectable beam to a thickness of the metal sheet is between 27:1 and 8:1.

20. The terminal of example 11, wherein a ratio a length of each deflectable beam to a thickness of the metal sheet is about 18:1.

21. The terminal of example 11, wherein each deflectable beam has a width of between 0.7 and 1.3 mm.

22. The terminal of example 11, wherein each deflectable beam has a width of about 1 mm.

23. The terminal of example 11, wherein a ratio a length of each deflectable beam to a width of each deflectable beam is between 12:1 and 4:1.

24. The terminal of example 11, wherein a ratio a length of each deflectable beam to a width of each deflectable beam is about 7:1.

25. The terminal of example 11, wherein each deflectable beam has a length of between 7 and 9 mm.

26. The terminal of example 11, wherein each deflectable beam has a length of about 8.5 mm.

27. The terminal of example 11, wherein the plurality of deflectable beams is 8 to 16 deflectable beams.

28. The terminal of example 11, wherein the plurality of deflectable beams is 12 deflectable beams.

29. An electrical power system, wherein the terminal of example 11 is configured to mate with a complementary power terminal; the system comprising:
- an electric vehicle or a system configured to charge and/or discharge a battery comprising:
  - the terminal or the complementary power terminal.

30. An electrical power system, wherein the terminal of example 11 is configured to mate with a complementary power terminal; the system comprising:
- an electric vehicle charging station or a system configured to charge and/or discharge a battery comprising:
  - the terminal or the complementary power terminal.

31. The terminal of example 11, wherein the terminal is configured to transmit electrical power having a current of at least 75 A.

32. The terminal of example 11, further comprising plating on the mating contact of each deflectable beam.

33. The terminal of example 32, wherein the plating comprises silver.

34. The terminal of example 32, wherein the plating comprises a first layer comprising a palladium nickel alloy and a second layer comprising gold.

35. The terminal of example 11, wherein the metal sheet comprises a copper alloy.

36. An electrical power system comprising:
- a first electrical connector comprising a first power terminal, the first terminal comprising a first stamped metal sheet formed around a first insertion axis, the first metal sheet comprising:
  - a hollow portion comprising a portion of the sheet formed around the insertion axis;
  - a first mounting contact coupled to the base;
  - a first mating contact on an exterior portion of the hollow portion,
- a second electrical connector comprising a second power terminal, the second terminal configured to mate with the first power terminal, the second terminal comprising a second metal sheet formed around a second insertion axis, the second metal sheet comprising:
  - a base comprising a portion of the sheet formed around the insertion axis;
  - a second mounting contact coupled to the base;
  - a plurality of deflectable beams extending from the second base, wherein:
    - each deflectable beam of the plurality of deflectable beams comprises a second mating contact;
    - the plurality of deflectable beams are arranged in a circle around the second insertion axis; and
    - the second mating contact of each deflectable beam faces the second insertion axis.

37. The electrical power system of example 36, wherein each of the plurality of deflectable beams of the second terminal generates a contact force of less than 1.0 N when the second power terminal is mated to the first power terminal.

38. The electrical power system of example 36, wherein each of the plurality of deflectable beams of the second terminal generates a contact force of about 0.1 to 1.0 N when the second power terminal is mated to the first power terminal.

39. The electrical power system of example 36, wherein each of the plurality of deflectable beams of the second terminal generates a contact force of about 0.43 to 0.76 N when the second power terminal is mated to the first power terminal.

40. The electrical power system of example 36, wherein the first terminal and the second terminal have a radial interference of less than 0.25 mm when mated.

41. The electrical power system of example 36, wherein the first terminal and the second terminal have a radial interference between 0.1 to 0.175 mm when mated.

42. The electrical power system of example 36, wherein the hollow portion of the first terminal is a cylindrical barrel and the barrel has an outer diameter between 3.0 to 5.5 mm.

43. The electrical power system of example 36, wherein the hollow portion of the first terminal is a cylindrical barrel and the barrel has an outer diameter between 3.6 to 4.8 mm.

44. The electrical power system of example 36, wherein each of the plurality of deflectable beams of the second terminal is configured such that, when the second power terminal is mated to the first power terminal, the deflectable beam deflects by an amount less than 50% of a deflection at an elastic limit of the deflectable beam.

45. A method of manufacturing a power terminal for an electrical connector, comprising:
- providing a metal sheet;
- stamping the metal sheet;
- forming, using the stamped metal sheet:
  - a hollow portion about an insertion axis of the terminal;
  - a mounting contact coupled to the hollow portion; and
  - a mating contact on an exterior portion of the hollow portion.

46. The method of example 45, wherein forming the hollow portion comprises rolling the metal sheet into a barrel.

47. The method of example 45, wherein forming the hollow portion comprises abutting a first edge of the metal sheet and a second edge of the metal sheet.

48. The method of example 47, wherein forming the hollow portion further comprises engaging a first engagement member at the first edge with a second engagement member at the second edge.

49. The method of example 45, wherein forming the hollow portion comprises forming a cylindrical barrel with an outer diameter between 3.6 and 4.8 mm.

50. The method of example 45, further comprising selectively plating the metal sheet.

51. A method of manufacturing a power terminal for an electrical connector, comprising:
- providing a metal sheet;
- stamping the metal sheet to form a plurality of deflectable beams each comprising a
- mating contact; forming, using the stamped metal sheet, a base around an insertion axis such that:
  - the plurality of deflectable beams extend from the base parallel to the insertion axis;
  - the plurality of deflectable beams are arranged around the insertion axis; and
  - the mating contact of each deflectable beam faces the insertion axis.

52. The method of example 51, wherein forming the base comprises rolling the metal sheet such that the plurality of deflectable beams are arranged in a circle around the insertion axis.

53. The method of example 51, wherein stamping the metal sheet to form a plurality of deflectable beams comprises forming each deflectable beam to comprise a straight beam with the mating contact formed at a distal end of the straight beam.

54. The terminal of example 51, wherein stamping the metal sheet to form a plurality of deflectable beams comprises forming each deflectable beam to comprise a straight beam with an arced segment with the mating contact on the arced segment.

55. The method of example 51, wherein forming the base comprises abutting a first edge of the metal sheet and a second edge of the metal sheet.

56. The method of example 55, wherein forming the base portion further comprises engaging a first engagement member at the first edge with a second engagement member at the second edge.

57. The method of example 51, wherein stamping the metal sheet to form a plurality of deflectable beams comprises stamping each beam with a ratio a length of each deflectable beam to a thickness of the metal sheet between 27:1 and 8:1.

58. The method of example 51, wherein stamping the metal sheet to form a plurality of deflectable beams comprises stamping each beam with a ratio a length of each deflectable beam to a thickness of the metal sheet of about 18:1.

59. The method of example 51, wherein stamping the metal sheet to form a plurality of deflectable beams comprises stamping each beam with a width between 0.7 and 1.3 mm.

60. The method of example 51, wherein stamping the metal sheet to form a plurality of deflectable beams comprises stamping each beam with a width of about 1 mm.

61. The method of example 51, wherein stamping the metal sheet to form a plurality of deflectable beams comprises stamping each beam with a ratio a length of each deflectable beam to a width of each deflectable beam between 12:1 and 4:1.

62. The method of example 51, wherein stamping the metal sheet to form a plurality of deflectable beams comprises stamping each beam with a width of each deflectable beam of about 7:1.

63. The method of example 51, wherein stamping the metal sheet to form a plurality of deflectable beams comprises stamping each beam with a length of between 7 and 9 mm.

64. The method of example 51, wherein stamping the metal sheet to form a plurality of deflectable beams comprises stamping each beam with a length of about 8.5 mm.

65. The method of example 51, wherein stamping the metal sheet to form a plurality of deflectable beams comprises stamping 8 to 16 deflectable beams.

66. The method of example 51, wherein stamping the metal sheet to form a plurality of deflectable beams comprises stamping 12 deflectable beams.

67. The method of example 51, further comprising selectively plating the metal sheet.

Also, the invention may be embodied as a method of manufacturing or of using an electrical connector, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as “first,” “second,” “third,” etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

All definitions, as defined and used herein, should be understood to control over dictionary definitions, definitions in documents incorporated by reference, and/or ordinary meanings of the defined terms.

The indefinite articles “a” and “an,” as used herein in the specification and in the claims, unless clearly indicated to the contrary, should be understood to mean “at least one.”

As used herein in the specification and in the claims, the phrase “at least one,” in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase “at least one” refers, whether related or unrelated to those elements specifically identified.

The phrase “and/or,” as used herein in the specification and in the claims, should be understood to mean “either or both” of the elements so conjoined, i.e., elements that are conjunctively present in some cases and disjunctively present in other cases. Multiple elements listed with “and/or” should be construed in the same fashion, i.e., “one or more” of the elements so conjoined. Other elements may optionally be present other than the elements specifically identified by the “and/or” clause, whether related or unrelated to those elements specifically identified. Thus, as a non-limiting example, a reference to “A and/or B”, when used in conjunction with open-ended language such as “comprising” can refer, in one embodiment, to A only (optionally including elements other than B); in another embodiment, to B only (optionally including elements other than A); in yet another embodiment, to both A and B (optionally including other elements); etc.

As used herein in the specification and in the claims, “or” should be understood to have the same meaning as “and/or” as defined above. For example, when separating items in a list, “or” or “and/or” shall be interpreted as being inclusive, i.e., the inclusion of at least one, but also including more than one, of a number or list of elements, and, optionally, additional unlisted items. Only terms clearly indicated to the contrary, such as “only one of” or “exactly one of,” or, when used in the claims, “consisting of,” will refer to the inclusion of exactly one element of a number or list of elements. In general, the term “or” as used herein shall only be interpreted as indicating exclusive alternatives (i.e., “one or the other but not both”) when preceded by terms of exclusivity, such as “either,” “one of,” “only one of,” or “exactly one of.” “Consisting essentially of,” when used in the claims, shall have its ordinary meaning as used in the field of patent law.

Also, the phraseology and terminology used herein are for the purpose of description and should not be regarded as limiting. The use of “including,” “comprising,” “having,” “containing,” or “involving,” and variations thereof herein, is meant to encompass the items listed thereafter (or equivalents thereof) and/or as additional items.

What is claimed is:

1. An electrical power connector, comprising:

a housing comprising:

a chamber;

a first projection disposed in the chamber and having a first opening; and a second projection disposed in the chamber and having a second opening;

a first power terminal exposed at the first opening and a second power terminal exposed at the second opening, each power terminal of the first and second power terminals having an insertion axis and comprising a metal sheet comprising:

a hollow portion comprising a portion of the sheet formed around the insertion axis;

a mounting contact coupled to the hollow portion;

a mating contact on an exterior portion of the hollow portion;

a plurality of signal terminals disposed between the first power terminal and the second power terminal.

2. The electrical power connector of claim 1, wherein:

the portion of the metal sheet formed into the hollow portion comprises a first edge and a second edge; and the portion of the metal sheet is formed such that the first edge is adjacent to the second edge.

3. The electrical power connector of claim 2, wherein:

the first edge comprises a first engagement member;

the second edge comprises a second engagement member;

the first engagement member is engaged with the second engagement member; and the first edge abuts the second edge.

4. The electrical power connector of claim 2, wherein:

the metal sheet comprises a distal edge perpendicular to the first edge and the second edge;

the distal edge of the sheet is coined such that an end of the hollow portion is chamfered; and the terminal further comprises an insulative cap inserted into the hollow portion.

5. The electrical power connector of claim 1, further comprising:

plating selectively covering the mating contact.

6. The electrical power connector of claim 1, wherein:

the hollow portion is a cylindrical barrel and an outer diameter of the barrel is between 3.6 and 4.8 mm.

7. The electrical power connector of claim 1, wherein:

each of the first and second power terminals comprises a pin; and the metal sheet is a single, integral sheet.

8. A power terminal for an electrical connector, the terminal having an insertion axis and comprising:

a metal sheet comprising:

a base comprising a portion of the sheet formed around the insertion axis;

a mounting contact coupled to the base;

a plurality of deflectable beams extending from the base parallel to the insertion axis, wherein:

the plurality of deflectable beams is 8 to 16 deflectable beams;

each deflectable beam of the plurality of deflectable beams extends from the base to a cantilevered end opposite the base;

a ratio a length of each deflectable beam to a thickness of the metal sheet is between 27:1 and 8:1;

a ratio a length of each deflectable beam to a width of each deflectable beam is between 12:1 and 4:1;

each deflectable beam of the plurality of deflectable beams comprises a mating contact at the cantilevered end of the deflectable beam;

each deflectable beam of the plurality of deflectable beams comprises plating on the mating contact;

the plurality of deflectable beams are arranged around the insertion axis; and the mating contact of each deflectable beam faces the insertion axis, wherein each of the plurality of deflectable beams is configured to generate a contact force of about 0.1 to 1.0 N applied to the plating on the mating contact of the deflectable beam when the terminal is mated with a radial interference between 0.1 to 0.175 mm to a complementary power terminal.

9. The terminal of claim 8, wherein each deflectable beam extending from the base parallel to the insertion axis comprises a straight beam with an arced segment, with the mating contact formed at a distal end of the straight beam on the arced segment.

10. The terminal of claim 8, wherein:

the base comprises a portion of the metal sheet comprising a first edge and a second edge separated by a width; and the portion of the metal sheet is rolled into a barrel with the first edge adjacent to the second edge; and the plurality of deflectable beams are arranged in a circle around the insertion axis.

11. The terminal of claim 8, wherein the terminal is configured to undergo 10,000 mating cycles with a complementary power terminal.

12. The terminal of claim 8, wherein:

the metal sheet has a thickness of between 0.3 and 0.7 mm.

13. The terminal of claim 8, wherein:

each deflectable beam has a width of between 0.7 and 1.3 mm.

14. The terminal of claim 8, wherein:

each deflectable beam has a length of between 7 and 9 mm.

15. An electrical power system, wherein the terminal of claim 8 is configured to mate with a complementary power terminal; the system comprising:

(a) an electric vehicle, (b) a system configured to charge and/or discharge a battery, (c) an electric vehicle charging station, or (d) a system configured to charge and/or discharge a battery, comprising:

the terminal or the complementary power terminal.

16. The terminal of claim 8, wherein the terminal is configured to transmit electrical power having a current of at least 75 A.

17. The terminal of claim 8, wherein the plating comprises: (a) silver or (b) a first layer comprising a palladium nickel alloy and a second layer comprising gold, wherein the metal sheet comprises a copper alloy.

18. An electrical power system comprising:

a first electrical connector comprising a first power terminal, the first terminal comprising a first stamped metal sheet formed around a first insertion axis, the first metal sheet comprising:

a first base;

a hollow portion comprising a portion of the first metal sheet formed around the first insertion axis;

a first mounting contact coupled to the first base;

a first mating contact on an exterior portion of the hollow portion, a second electrical connector comprising a second power terminal, the second terminal configured to mate with the first power terminal, the second terminal comprising a second metal sheet formed around a second insertion axis, the second metal sheet comprising:

a second base comprising a portion of the second metal sheet formed around the second insertion axis;

a second mounting contact coupled to the second base;

a plurality of deflectable beams extending from the second base, wherein:

each deflectable beam of the plurality of deflectable beams comprises a second mating contact;

the plurality of deflectable beams are arranged in a circle around the second insertion axis; and the second mating contact of each deflectable beam faces the second insertion axis, wherein the first terminal and the second terminal have a radial interference between 0.1 to 0.175 mm when mated;

wherein each deflectable beam of the plurality of deflectable beams of the second terminal comprises plating on the second mating contact; and wherein when the first power terminal is mated to the second power terminal, the radial interference of the first terminal and the second terminal generates, for each of the plurality of deflectable beams, a contact force of about 0.1 to 1.0 N applied to plating on the second mating contact of the deflectable beam.

19. The electrical power system of claim 18, wherein the hollow portion of the first terminal is a cylindrical barrel and the barrel has an outer diameter between 3.0 to 5.5 mm.

20. The electrical power system of claim 18, wherein each of the plurality of deflectable beams of the second terminal is configured such that, when the second power terminal is mated to the first power terminal, the deflectable beam deflects by an amount less than 50% of a deflection at an elastic limit of the deflectable beam.

* * * * *